US009405688B2

(12) United States Patent
Nagarajan et al.

(10) Patent No.: US 9,405,688 B2
(45) Date of Patent: Aug. 2, 2016

(54) METHOD, APPARATUS, SYSTEM FOR HANDLING ADDRESS CONFLICTS IN A DISTRIBUTED MEMORY FABRIC ARCHITECTURE

(71) Applicants: Ramadass Nagarajan, Hillsboro, OR (US); Robert G. Milstrey, Citrus Heights, CA (US); Michael T. Klinglesmith, Portland, OR (US)

(72) Inventors: Ramadass Nagarajan, Hillsboro, OR (US); Robert G. Milstrey, Citrus Heights, CA (US); Michael T. Klinglesmith, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 371 days.

(21) Appl. No.: 13/785,908

(22) Filed: Mar. 5, 2013

(65) Prior Publication Data

US 2014/0258620 A1  Sep. 11, 2014

(51) Int. Cl.
G06F 12/08 (2016.01)
G06F 12/0815 (2016.01)
G06F 12/0806 (2016.01)
G06F 12/0844 (2016.01)
G06F 12/02 (2006.01)

(52) U.S. Cl.
CPC ............ *G06F 12/0815* (2013.01); *G06F 12/02* (2013.01); *G06F 12/08* (2013.01); *G06F 12/0806* (2013.01); *G06F 12/0844* (2013.01); *G06F 2212/621* (2013.01)

(58) Field of Classification Search
CPC . G06F 12/08; G06F 12/0815; G06F 12/0806; G06F 12/02; G06F 12/0844

USPC ................. 711/120, 148, 151, E12.083, 171; 712/202, 217, 237, E9.049, E9.072
See application file for complete search history.

(56) References Cited

U.S. PATENT DOCUMENTS

| 5,832,304 | A  | * | 11/1998 | Bauman et al. .................. 710/40 |
| 5,875,472 | A  | * | 2/1999  | Bauman et al. ................ 711/150 |
| 6,622,225 | B1 | * | 9/2003  | Kessler et al. ................. 711/158 |
| 8,327,187 | B1 |   | 12/2012 | Metcalf |
| 8,521,963 | B1 | * | 8/2013  | Miao et al. ..................... 711/141 |
| 2005/0149654 | A1 | * | 7/2005 | Holloway et al. ............. 710/100 |
| 2005/0154866 | A1 |   | 7/2005 | Steely et al. |
| 2008/0016278 | A1 | * | 1/2008 | Clark .................. G06F 12/0817 711/118 |

(Continued)

FOREIGN PATENT DOCUMENTS

TW   200809511 A   2/2008
WO   2014/137864 A1   9/2014

OTHER PUBLICATIONS

International Search Report and Written Opinion received for PCT Patent Application No. PCT/US2014/019790, mailed on Jun. 27, 2014, 12 pages.

(Continued)

*Primary Examiner* — Kevin Verbrugge
*Assistant Examiner* — Kamal Dewan
(74) *Attorney, Agent, or Firm* — Law Office of R. Alan Burnett, PS

(57) ABSTRACT

Method, apparatus and system for handling address conflicts in distributed memory fabrics. Memory access requests originating from caching agents and Input/Output (I/O) agents in a computer system are serviced concurrently through use of a distributed memory fabric architecture employing parallel pipelines while maintaining memory coherency for cachelines associated with the caching agents and enforcing memory access ordering for memory access requests originating from I/O agents.

29 Claims, 9 Drawing Sheets

(56) References Cited

U.S. PATENT DOCUMENTS

| | | |
|---|---|---|
| 2008/0140980 A1* | 6/2008 | Mei et al. .............. 711/170 |
| 2009/0037665 A1* | 2/2009 | Tsien .............. G06F 12/0831 711/141 |
| 2009/0077329 A1* | 3/2009 | Wood et al. .............. 711/156 |
| 2009/0150644 A1 | 6/2009 | Kwon et al. |
| 2010/0332757 A1 | 12/2010 | Nychka et al. |
| 2011/0202731 A1 | 8/2011 | Ohmacht |
| 2011/0252202 A1 | 10/2011 | Heine et al. |
| 2014/0173342 A1* | 6/2014 | Kaushikkar et al. ........... 714/30 |

OTHER PUBLICATIONS

Office Action received for Taiwan Patent Application No. 103105661, mailed on May 4, 2015, 19 pages of Taiwan Office Action and 2 pages of English Search report.

International Preliminary Report on Patentability and Written Opinion Received for PCT Patent Application No. PCT/US2014/019790, mailed on Sep. 17, 2015, 8 pages.

* cited by examiner

METHOD, APPARATUS, SYSTEM FOR HANDLING ADDRESS CONFLICTS IN A DISTRIBUTED MEMORY FABRIC ARCHITECTURE

FIELD

This disclosure pertains to computing system, and in particular (but not exclusively) to handling address conflicts in distributed memory fabrics.

DETAILED DESCRIPTION

Figure 1:
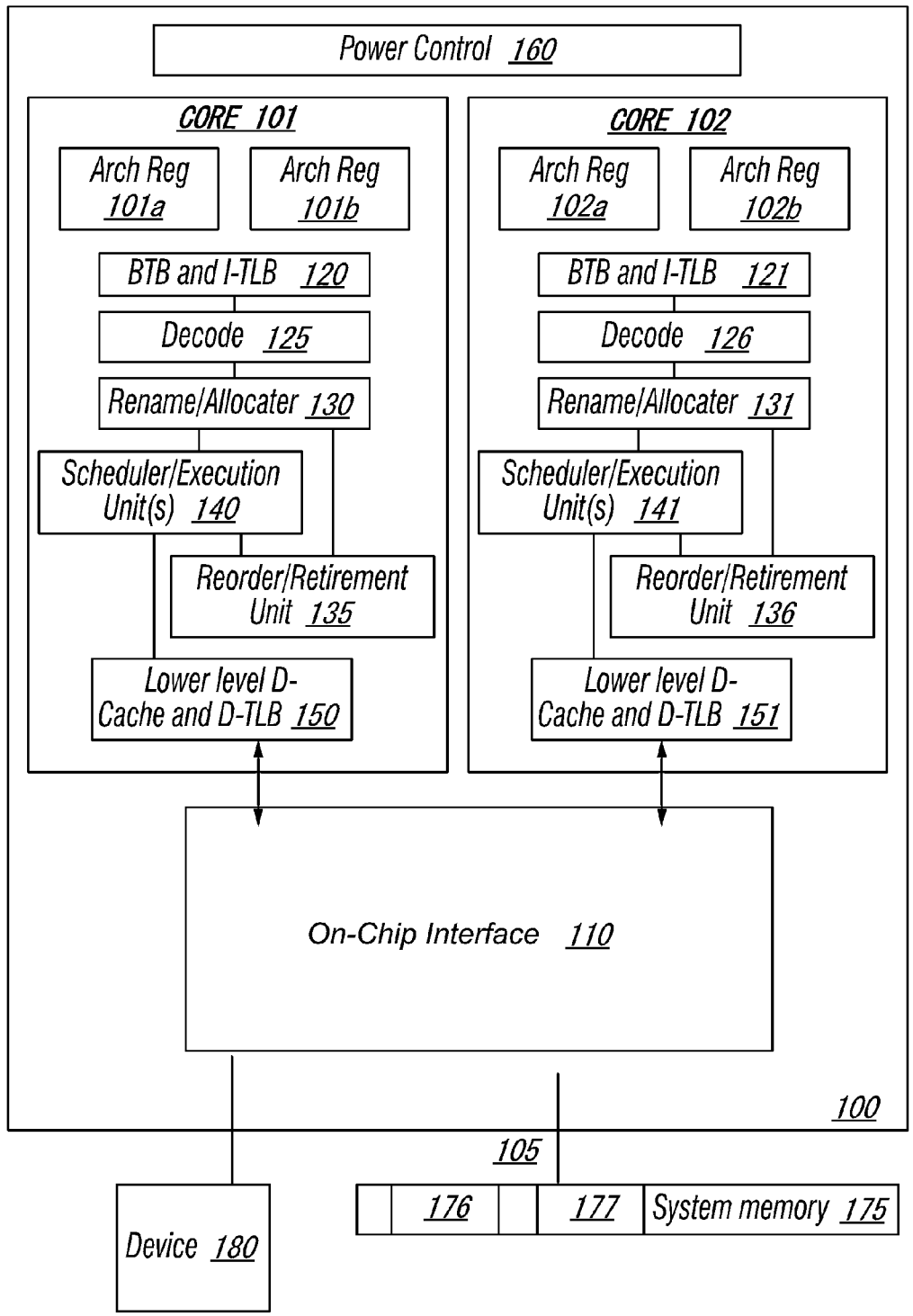
FIG. 1 illustrates an embodiment of a block diagram for a computing system including a multicore processor.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments may be used in devices such as but not limited to handheld devices, tablets, Ultrabooks™ and other thin notebooks, systems on a chip (SOC) devices, desktop computer systems, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the inventions described herein.

FIG. 1

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers 101a are replicated in architecture state registers 101b, so individual architecture states/contexts are capable of being stored for logical processor 101a and logical processor 101b. In core 101, other smaller resources, such as instruction pointers and renaming logic in allocator and renamer block 130 may also be replicated for threads 101a and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to BTB and I-TLB buffers 120 to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 110 is to communicate with devices external to processor 100, such as system memory 175, a chipset (often including a memory controller hub to connect to memory 175 and an Input/Output (I/O or IO) controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as implemented by a System on a Chip (SoC), each of these devices may be incorporated on processor 100. For example, in one embodiment a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, in one embodiment on-chip interface 110 includes a ring interconnect for on-chip communication and a high-speed serial point-to-point link 105 for off-chip communication. Alternatively, on-chip communication may be facilitated by one or more switch fabrics having a mesh-type configuration. Yet, in the SoC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 2:
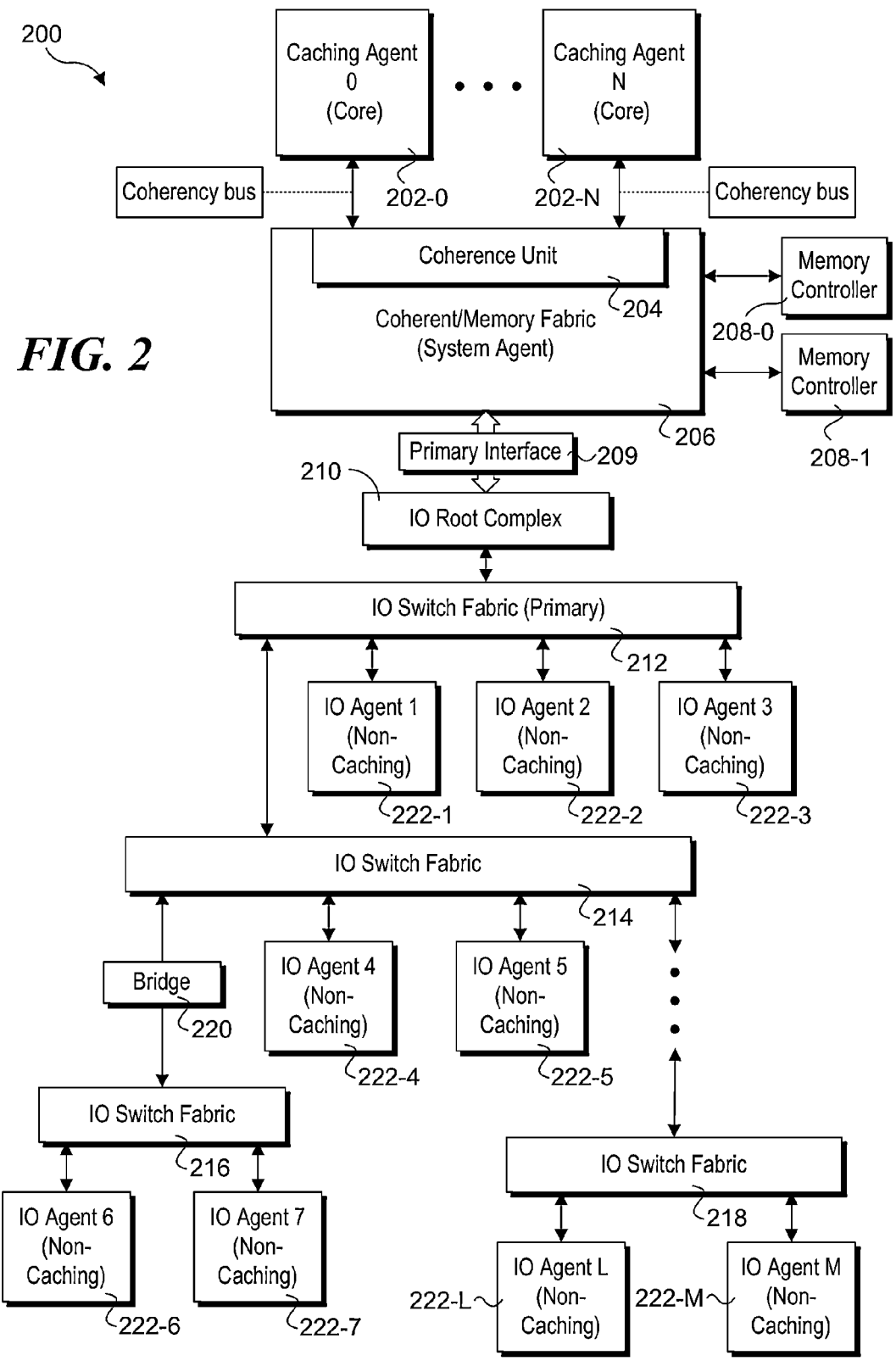
FIG. 2 illustrates an embodiment of a block diagram for a computing system including a system agent implementing distributed coherent and memory fabric.

Referring now to FIG. 2, shown is a block diagram of an embodiment of a system architecture 200. In one embodiment system architecture 200 corresponds to an SoC architecture comprising a multicore processor. More generally, the components illustrated in FIG. 2 may be implemented as one or more integrated devices such as semiconductor chips.

System architecture 200 includes a plurality of processor cores 202 (depicted as 202-0 . . . 202-N) coupled to a coherence unit 204 of a system agent 206 via a coherency bus. System agent 206 supports various system functions including interfacing caching agents in cores 202 and other non-caching IO agents to memory controllers 208-0 and 208-1. (As used herein the terms IO and I/O both refer to Input/Output and are used interchangeable.) As described in further detail below, in one embodiment system agent 206 is configured to implement a distributed coherent and memory fabric including support for coherent operation through facilities provided by coherence unit 204.

In one embodiment, a caching agent is associated with each "logical" processor core associated with processor cores 202. For example, under Intel's® Hyperthreading™ architecture, each physical core as implemented as two logical cores. Generally, caching agents may be associated with one or more logical processors, as well as other entities accessing coherent memory, such as graphics engines or the like.

System agent 206 is also coupled, via a primary interface 209, to an IO root complex 210, which in turn is coupled to or integrated in a primary IO switch fabric 212. IO root complex 210 and primary IO switch fabric 212 are implemented in a top level of a multi-level IO interconnect hierarchy employing multiple switch fabrics residing at different levels in the hierarchy, as depicted by switch fabrics 214, 216, and 218. A given branch of the IO interconnect hierarchy may employ the same type of switch fabrics employing a common architecture and protocol, or different types of switch fabrics that employ different architectures and/or protocols. In the latter case, a bridge will typically be implemented to operate as an interface between a pair of switch fabrics having different architectures/protocols, such as depicted by a bridge 220. As used herein, a switch fabric may generally comprise an interconnect, bus structure, multi-dimensional mesh fabric, or other known interconnect architecture and associated interface logic configured to facilitate communications between components coupled to the switch fabric. The IO switch fabrics architectures/protocols may include but are not limited to Peripheral Component Interconnect Express (PCIe™), Open Core Protocol (OCP), Intel On-chip System Fabric (IOSF), and Advanced Microcontroller Bus Architecture (AMBA) interconnects.

Various IO devices are coupled to the various switch fabrics in the IO hierarchy, with each IO device configured to implement or associated with an IO agent 222, as depicted by IO agents 222-1 through 222-M (also respectively labeled IO Agent 1-M). In the illustrated embodiment, each of these IO agents comprises a non-caching agent. Typically, an IO agent is configured to perform operations on behalf of its associated device, such as communication operations, enabling the device to communicate with other components in the system. Accordingly, IO agents are often implemented in conjunction with communication interfaces and other types of interfaces, which may be depicted herein as separate components or may be integrated in other components, such as devices, bridges, and switch fabrics.

Under system architecture 200, system agent 206 implements the heart of the coherent and memory interconnect fabric in the system. It implements the cache coherency protocol, producer-consumer ordering rules specified by the architecture's programming model, IO root complex functions, and Quality-of-Service (QoS) aware arbitration for various agents requesting access to memory and to other devices in the system.

Under a typical architecture, the coherent and memory fabric inside the system agent typically operates only on cache coherent requests to distinct cache lines to ensure correct coherent behavior across all caching agents in the system. Therefore the processing of a request must be stalled until a prior request to the same cache line as the current one has completed. These stall conditions are typically referred to as address conflicts. Handling address conflicts correctly is a challenging problem for many reasons, including the following: a) Ordering—requests with conflicts have certain ordering requirements amongst themselves and also with unrelated younger requests; b) Uncompromised performance—a conflict from one agent should not degrade performance and QoS for unrelated agents that share the same interconnect links and the coherent fabric; c) Distribution—ordering of conflicts and related requests must be maintained across any distributed pipelines in the fabric; and d) Low cost—system resources required to handle address conflicts should be kept as low as possible for the best power-constrained performance.

Figure 3:
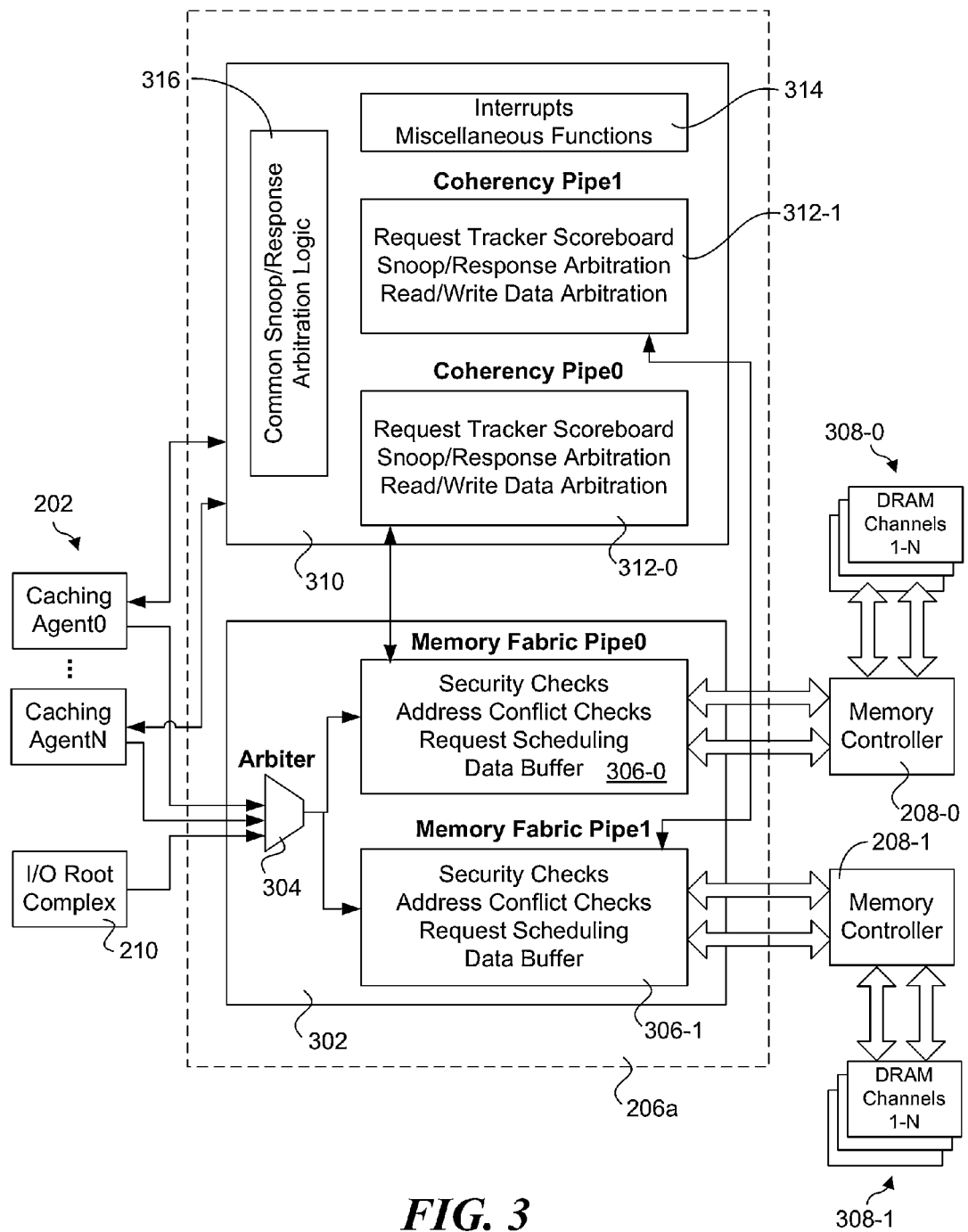
FIG. 3 illustrates an embodiment of a system agent including a distributed and coherent memory fabric.

FIG. 3 shows further details of one embodiment of a system agent 206a including a distributed and coherent memory fabric. System agent 206a includes a shared memory fabric 302 that contains a common memory access request arbiter (Arbiter) 304 and two memory fabric pipelines 306-0 and 306-1 to schedule requests to system memory 308-0 and 308-1 (respectively accessed via memory controllers 208-0 and 208-1), a shared coherent fabric 310 that includes two coherent fabric pipelines 312-0 and 312-1 to manage cache coherency, a non-coherent engine to handle miscellaneous functions 314 such as interrupts, and common snoop/response arbitration logic 316. Caching agents 202 present their requests directly to Arbiter 304. IO agents 222 (not shown) issue their requests via IO root complex 210, which subsequently issues the requests on behalf of the IO agents to Arbiter 304.

To implement differentiated QoS, in one embodiment both the IO fabric(s) and primary interface 209 implement multiple virtual channels that share a single physical interconnect interface. For design simplicity, in one embodiment a typical system configuration may run the common hardware shared by the two memory fabric pipelines and the two coherent fabric pipelines at twice the frequency as the individual pipelines. In addition, the multiple pipeline architecture is configured to perform pipelined operations for servicing memory access requests in parallel. Although two coherency and memory pipelines are depicted in FIG. 2, it will be understood that the general teachings and principles disclosed herein may be extended to implement similar parallel operations across multiple pipelines.

Arbiter 304 arbitrates and grants one request each cycle and routes requests to one of the two memory fabric pipelines as determined through use of a hash algorithm applied to data contained in the request, such as a cacheline address. The hash algorithm ensures that requests to the same cacheline are always routed to same memory fabric pipeline. Since Arbiter 304 is the common entry point for both memory fabric pipelines 306-0 and 306-1, the Arbiter in a typical system may run at up to twice the frequency as the memory fabric pipelines.

Figure 4:
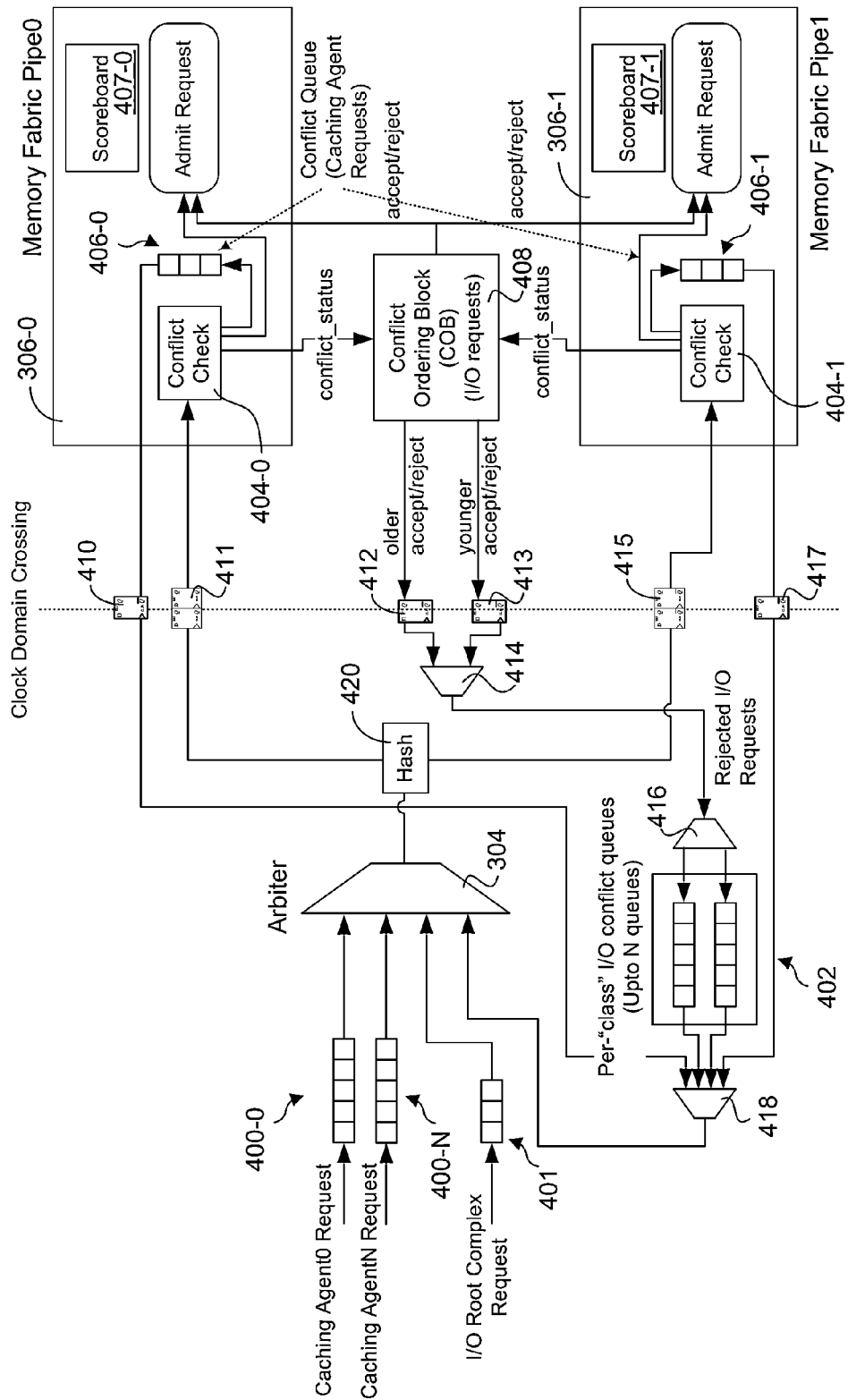
FIG. 4 illustrates further details of the distributed memory fabric of FIG. 3, according to one embodiment.

FIG. 4 shows further details of memory fabric 302, according to one embodiment. In addition to Arbiter 304 and memory fabric pipelines 306-0 and 306-1, the components and logic illustrated in FIG. 4 include caching agent request queues 400-0 and 400-N, a I/O root complex request queue 401, per-"class" I/O conflict queues 402, conflict check logic blocks 404-0 and 404-1, caching agent conflict queues 406-0 and 406-1, scoreboards 407-0 and 407-1, a conflict ordering block (COB) 408, flip-flops 410, 411, 412, 413, 415, and 417, a rejected IO request multiplexer (mux) 414, a rejected IO request demux 416, a conflict queue arbiter 418, and hash logic 420.

Each of memory fabric pipelines 306-0 and 306-1 implement conflict checking to ensure that the entire system agent is operating only on coherent requests to distinct cache lines. This is implemented through address match logic to detect conflicts to prior pending requests and if there are any conflicts, it prevents the request from further processing. If there are no conflicts, the memory fabric pipeline notifies its corresponding coherent pipeline for cache coherency operations. It also logs the request into the scoreboard 407 in the memory fabric pipeline for scheduling out to system memory.

Requests that are picked by Arbiter 304 but hit a conflict condition as described above cannot be admitted. Instead they are enqueued into one of many conflict queues. The conflict queues are separate for caching agents (i.e., caching agent conflict queues 406-0 and 406-1) and I/O agents (i.e., per-class I/O conflict queues 402). Each memory fabric pipeline implements a single conflict queue meant for requests from all caching agents. For ordering and QoS reasons, the conflict queues for I/O agents are maintained separately and implemented as separate queues shared by both the pipelines.

Conflict Queues for Caching Agents

The caching agent conflict queues 406-0 and 406-1 are meant exclusively for requests from caching agents. Generally, a caching agent conflict queue may have a configurable depth that may differ between implementations. In one embodiment, the caching agent conflict queue reserves one entry for each logical processor and a shared pool to cover the depth of the pipeline from Arbiter 304 to the conflict check block 404 the conflict queue is associated with.

In one embodiment, each entry in a caching agent conflict queue contains the following attributes:
- valid: is the entry valid or not?;
- is_mmio: whether the request is targeting MMIO (memory-mapped IO);
- conflict_btag: Tag of the prior request that this request is conflicting against;
- conflict_cleared: Whether the conflict has cleared for this entry or not. Will be set to 0 initially (with exceptions as noted below). Will be set to 1, when the prior request causing the conflict retires; and
- All original request attributes associated with the memory access requests received at the Arbiter.

In one embodiment, to maintain program ordering, the rules for the caching agent conflict queue are as follows:
1. All requests to the same address are processed in the order they are granted by Arbiter 304. An address match check is performed for each inbound request against every entry in the caching agent conflict queue and the scoreboard for the memory fabric pipeline to which the request is routed.
2. If inbound request is from a caching agent: If there is an address match with an already pending request, then the request is enqueued to the caching agent conflict queue (for the applicable memory fabric pipeline) and the Tag for the prior request is stored into the conflict_btag attribute and conflict_cleared is set to 0. If there is match to a prior entry in the conflict queue, but not a match to a pending request, then the new request is also enqueued to the conflict queue, but conflict_cleared is set to 1. This means that when this entry gets to the head of the conflict queue, it is eligible to re-arbitrate right away.

I/O Conflict Queues

The system agent implements a configurable number of I/O conflict queues 402, one per "class", for requests from the I/O root complex. The number of queues may vary depending on the system implementation. These conflict queues ensure deadlock avoidance and provide QoS guarantees to agents that require them. Each queue is expected to be as deep as required to cover the pipeline latency from I/O root complex 210 to the conflict check logic. If a request is determined to have a conflict, it is enqueued into an appropriate I/O conflict class queue. In one embodiment, configuration registers programmable by BIOS (of other system firmware) specify the mapping of each virtual channel (VC) to a conflict queue class (i.e., each VC is assigned to a class). A given VC can belong to only one conflict class. The system agent determines the class based on the request's VC and the mapping provided by the configuration registers to decide which I/O conflict queue to enqueue the request into.

The conflict classes exploit the observation that conflicts across I/O agents are rare events and are also rare events for certain types of I/O agents. Thus, in some embodiments the system collapses virtual channels that are dependence-free (for ensuring deadlock avoidance) and that are expected to cause conflicts only on rare occasions and that require similar QoS guarantees into the same conflict queue class. This scheme allows multiple virtual channels to be collapsed into relatively fewer classes for conflict-checking purposes. This in turn reduces area overhead—instead of provisioning dedicated resources for each virtual channel, the I/O conflict check hardware only needs to provision dedicated resources for each class, wherein the number of classes is less than the number of virtual channels.

In one embodiment, each entry of an I/O conflict queue contains similar attributes as the conflict queue for caching agents presented above. In the case of an I/O request, the original request attributes will include the VC associated with the I/O agent from which the request originated. In one embodiment, the rules for an I/O conflict queue are as follows:
1. All requests to the same address from a given VC are processed in the order they are granted by Arbiter 304.
2. Once a write request encounters a conflict and is enqueued into one of the class queues in I/O conflict queue 402, all write requests from the same VC, regardless of the address, are processed in order.

Without Rule #2 above, producer-consumer ordering involving the I/O agents could be violated. Consider the following sequence.
1. I/O device produces data in cacheable memory. Therefore the CPU must be snooped before the write can become globally observed. However, this request encounters an address conflict in one of the memory fabric pipelines, which can happen if a device performs several writes to the same address. The conflict will cause the request to queued up in the conflict queue.
2. I/O device does flag update to cacheable memory. Assume the flag update targets the other memory fabric pipeline and has no conflict and proceeds.
3. CPU reads flag. CPU could get the updated value from Step 2.
4. CPU reads data. Since request from 1 was not globally observed yet, CPU could be reading stale data from its cache. This is an ordering violation.

Figure 5:
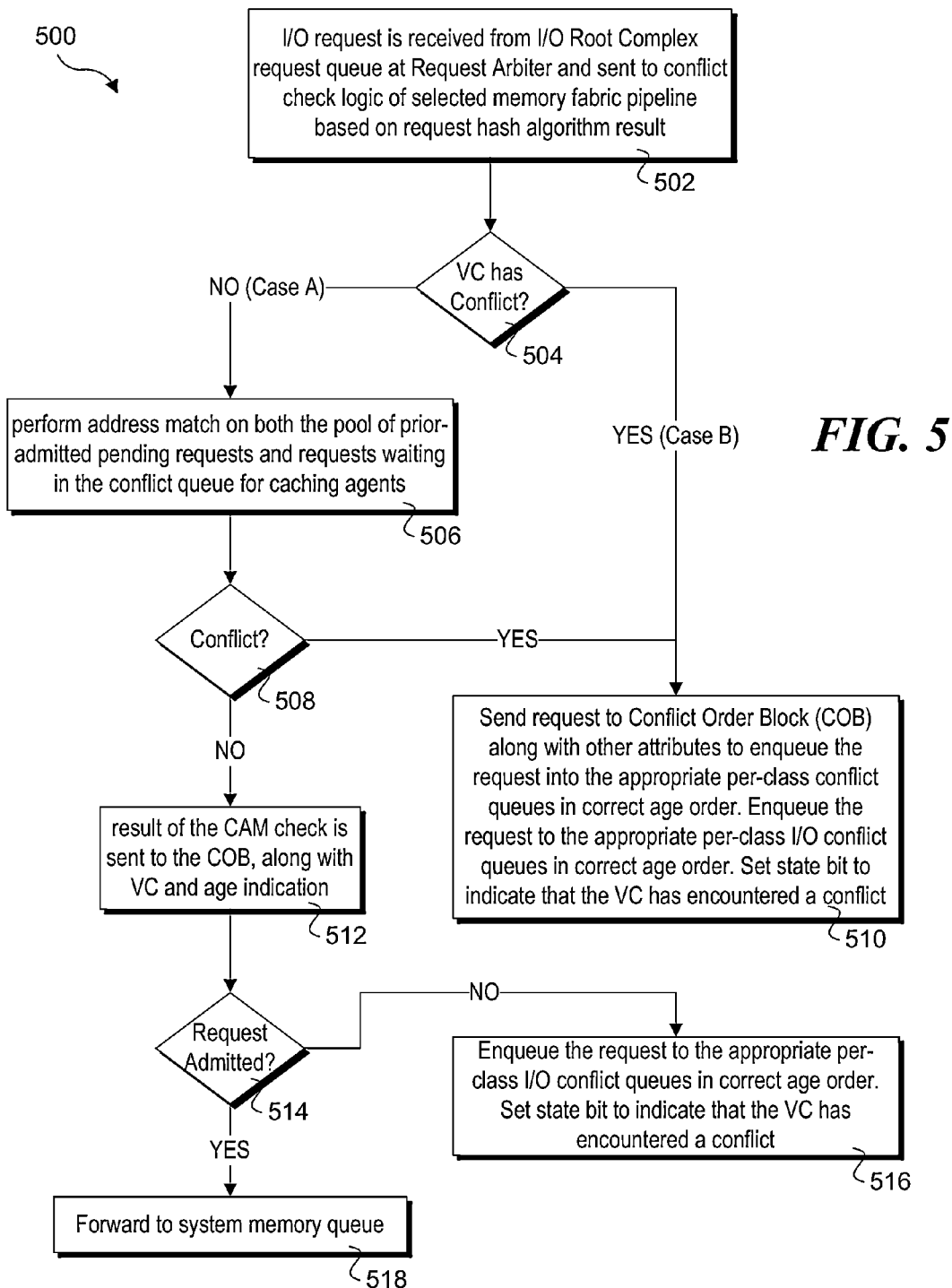
FIG. 5 is a flowchart illustrating operations and logic for enforcing memory access request ordering for virtual channels, according to one embodiment.

Thus, in one embodiment, even when consecutive I/O requests target different memory fabric pipelines, request ordering from the same VC behind a conflict are preserved. From the perspective of the I/O agent request originators, requests from I/O agents that are sent via the same virtual channel appear to be serviced in the order in which they are received at the distributed memory fabric With reference to the flowchart 500 of FIG. 5, in one embodiment this is accomplished as follows.

The processing of I/O requests (i.e., memory access requests originating from IO agents) begins at a block 502 in which an I/O request is received from I/O Root Complex request queue 401 at Arbiter 304 and sent to the conflict check logic 404 of the appropriate memory fabric pipeline 306-0 or 306-1 based on the request hash algorithm result. On each inbound I/O root complex request, two cases apply, as depicted by the results of a decision block in which a determination is made to whether the VC has an existing conflict:
A. Case A, VC has no conflicts currently: In a block 506, conflict check logic 404 performs an address match on both the pool of prior-admitted pending requests in scoreboard 407 and requests waiting in the caching agent conflict queue 406 for the memory fabric pipeline 306 handling the request. As depicted by a decision block 508 and a block 510, if there is a conflict, the request is sent to the conflict ordering block (COB)

along with other attributes to enqueue the request into the appropriate per-class conflict queues in correct age order. A state bit is also set to indicate that the VC has encountered a conflict. If there is no conflict, the result of the conflict address match check is sent to the COB, along with VC and age indication, as shown in a block 512. The COB provides the final indication to the pipeline as to whether or not the request can be admitted, as depicted by a decision block 514. If the request cannot be admitted, in a block 516 the COB enqueues the request to the appropriate per-class I/O conflict queues 402. A state bit is also set to indicate that the VC has encountered a conflict. If the request can be admitted, it is forward to an applicable system memory queue for further processing relating to the requested memory transaction, as depicted by a block 518.

B. Case B, VC already has a conflict: As depicted by a YES result to decision block 504, if the VC already has a conflict the conflict check logic bypasses the address match and the request is sent to the COB along with other attributes to enqueue the request into its per-class conflict queue in correct age order in block 510.

During each cycle, the COB uses the age token for requests sent to it by the two pipelines and determines which is older and which is younger. In one embodiment, the age token is a 2-bit counter value that is passed with each request by Arbiter 304. The Arbiter increments the counter every time it grants a request. It passes the token value along with the rest of the request attributes to the applicable memory fabric pipeline 306. If arbitrated enough times, the counter may overflow. As such, the order determination logic in the COB is configured to handle the overflow conditions.

Figure 6:
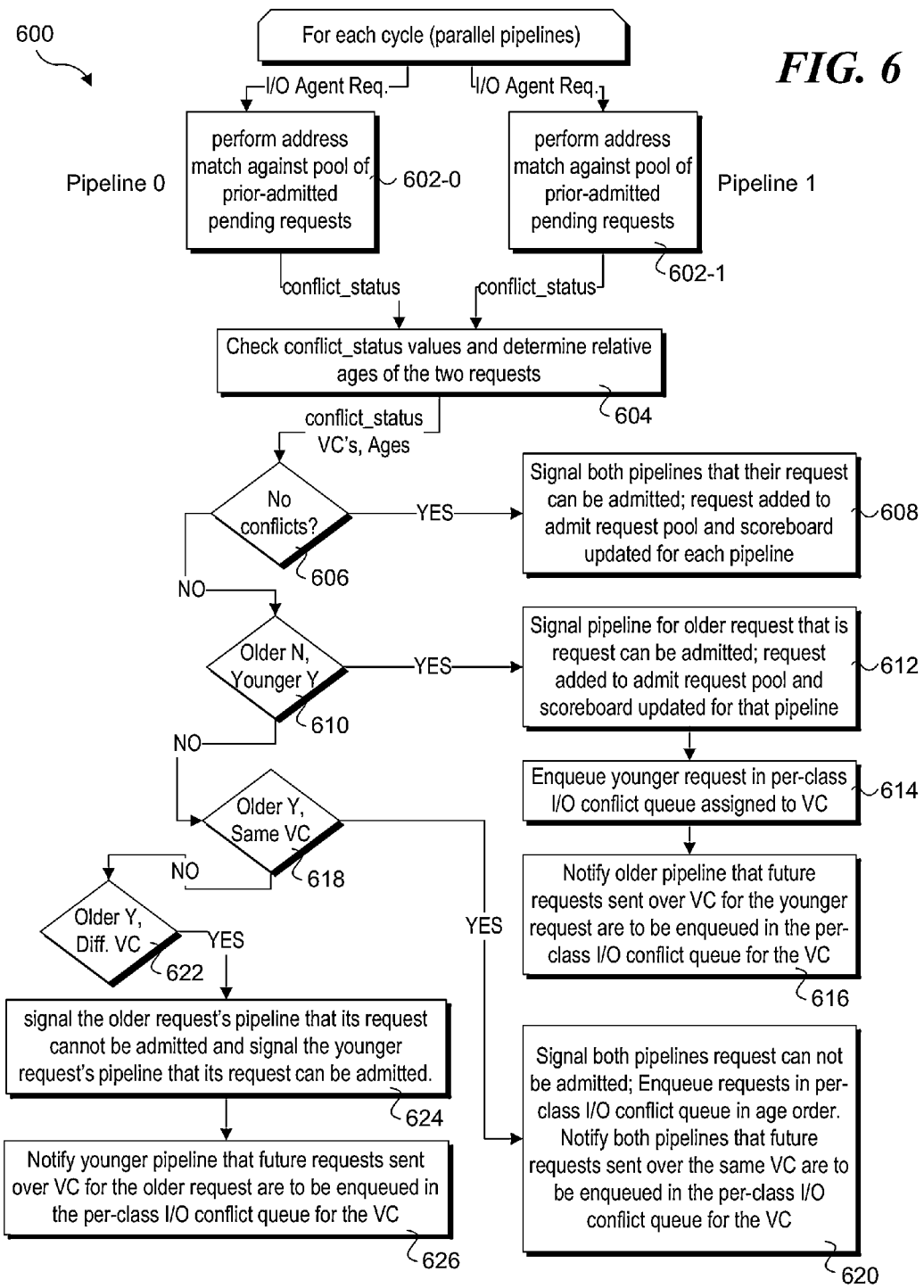
FIG. 6 is a flowchart illustrating operations and logic for performing conflict ordering operations, according to one embodiment.

For IO agent requests, the COB provides the final notification to the memory fabric pipelines on whether their requests can be admitted. Operations and logic for performing the COB operations and related operations are illustrated in flowchart 600 of FIG. 6. As depicted at the top of flowchart 600, the operations and logic are performed in parallel for each of the memory fabric pipelines. During each cycle, a pair of memory requests will advance to the same location in each pipeline. In this scenario, a pair of memory access requests originating from IO agents are being handled in parallel, thus support concurrent processing of multiple memory access requests.

As depicted in blocks 602-0 and 602-1, the conflict check logic in each of pipelines 0 and 1 perform an address match against the pool of previously-admitted pending requests for which service has yet to be completed. As discussed above, identification of these requests are maintained by the scoreboard 407 for each pipeline. Attributes of each request, including a conflict_status bit indicating the result of the address conflict check are passed to a block 604 in which the conflict_status values are checked and the relative ages of the two request are determined based on the age tokens, resulting in identifying an older and younger request.

In a decision block 606 a determination is made to whether neither request has a conflict. If the answer is YES, the logic proceeds to a block 608 in which both pipelines are signaled by the COB to indicate that their request can be admitted. Accordingly, at each pipeline the request associated with that pipeline is added to the pipeline's admit request pool and the pipeline's scoreboard is updated.

Next, if the answer to decision block 606 is NO, a determination is made in a decision block 610 to whether the older request does not have a conflict and the younger request has a conflict. If the answer is YES, the logic proceeds to a block 612 in which the COB signals the pipelines associated with the request indicating the request can be admitted. The request is then added to the admit request pool for that pipeline and the pipeline's scoreboard is updated. In a block 614, the conflicting younger request is enqueued in the per-class I/O conflict queue to which its VC is mapped. The COB also notifies the pipeline associated with the older request that future requests sent over the same VC as used for the younger request are to be enqueued in the per-class I/O conflict queue for the VC until the younger request is admitted during subsequent processing.

If the answer to decision block 610 is NO, a determination is made in a decision block 618 to whether the older request has a conflict and both requests have been sent over the same VC. If the answer is YES, the logic proceeds to a block 620 in which the COB signals both pipelines to indicate their requests cannot be admitted. The requests are then enqueued in the per-class I/O conflict queue assigned to the VC in age order (i.e., older request, followed by younger request). The COB also notifies both the pipelines that future requests sent over the same VC are to be enqueued in the per-class I/O conflict queue for the VC until the older request is admitted during subsequent processing.

If the answer to decision block 618 is NO, a determination is made in a decision block 622 to whether the older request has a conflict and the requests have been sent over different VCs. If the answer is YES, the logic proceeds to a block 624, wherein the COB signals the older request's pipeline that its request cannot be admitted and signals the younger request's pipeline that its request can be admitted. The COB also notifies the pipeline associated with the younger request that future requests sent over the same VC as used for the older request are to be enqueued in the per-class I/O conflict queue for the VC until the older request is admitted during subsequent processing, as depicted in a block 626.

In flowchart 600 it is noted that although some operations are depicted in an order, this is merely for explanation purposes and is not meant to be limiting. Rather, various operations may be performed in parallel. For example, each of the determinations associated with decision blocks 606, 610, 618 and 622 may be performed in parallel. Similarly, operations performed in blocks 612, 614, and 616 and operations performed in blocks 624 and 626 may be performed in parallel.

As described above, the system agent enqueues every request from the same VC after a conflict into the conflict queue in original request order. In effect, this results in head-of-line blocking (HOL) of each VC behind the conflict, but results in simpler microarchitecture. To mitigate the performance degradation due to HOL blocking, the system agent employs request combining solutions for certain type of requests. For example, non-snooped requests can be combined provided:

a. They are all from the same VC;
b. They are all reads or all writes; and
c. Only up to N requests to the same 32 Byte chunk can be combined. The next request will be tagged as having a conflict. (N is a configurable number depending on the implementation).

Re-Arbitration from the Conflict Queues

Requests from both the caching agent conflict queues and I/O conflict queues can re-arbitrate back to the Arbiter once the conflicting condition clears. When a request retires from the system agent it broadcasts its Tag to all the entries in all conflict queues. If the Tag matches an entry it clears the request in that conflict queue entry for re-arbitration. In one embodiment, a simple round-robin arbiter selects among the head requests in all the conflict queues. The granted request is re-arbitrated back through the Arbiter with the highest priority.

Anti-Starvation: To avoid starvation, the conflict check logic continues to flag conflicts until it sees the original request re-arbitrating from the conflict queue. In one embodiment this is done with additional bookkeeping logic within scoreboards 407 in the memory fabric pipelines, as follows.

When re-arbitrating back into the Arbiter from the conflict queues, a bit called "prior_conflict" is asserted and sent along with the request to the memory fabric pipeline for address match detection.

When a request clears a subsequent conflict and retires, it asserts a bit in the scoreboard called "conflict_block".

Any new request with "prior_conflict" deasserted, but has an address match with the scoreboard entry with conflict_block asserted will be flagged as a conflict and enqueued into the conflict queue. The "conflict_cleared" bit will be set marking this request as eligible for re-arbitration when it gets to the head of its conflict queue.

Any new request with "prior_conflict" asserted, but has an address match with the scoreboard entry with conflict_block asserted will not be flagged as conflict. The new request will be allocated into the same scoreboard entry and "conflict_block" bit will be cleared.

Conflict Queue Flow Control

Conflict queues for caching agents: Flow control for caching agent conflict queues 406-0 and 406-1 is fully managed between Arbiter 304 and the memory fabric pipelines 306-0 and 306-1. Each memory fabric pipeline publishes both a reserved credit per logical processor and a credit for the shared pool. Arbiter 304 may grant a request from a caching agent only if it has a credit for the conflict queue in the hashed pipeline—either a reserved credit or a shared credit. The Arbiter consumes a credit when it grants a request. The memory fabric pipeline returns a credit when the conflict checks pass with no conflict, or when a request is dequeued from its caching agent conflict queue 406.

I/O Agent conflict queues: Flow control for IO conflict queues 402 is managed with I/O root complex 210. The I/O root complex maintains the credit counters for each of the per-class conflict queues. The credits for each IO conflict queue 402 are initialized and subsequently exchanged with the memory fabric pipelines 306-0 and 306-1. The I/O root complex consumes a credit prior to launching a request for a conflict queue class. The memory fabric pipeline returns a credit when it detects that a request does not have a conflict, or when a request is dequeued from the per-class conflict queue.

Figure 7:
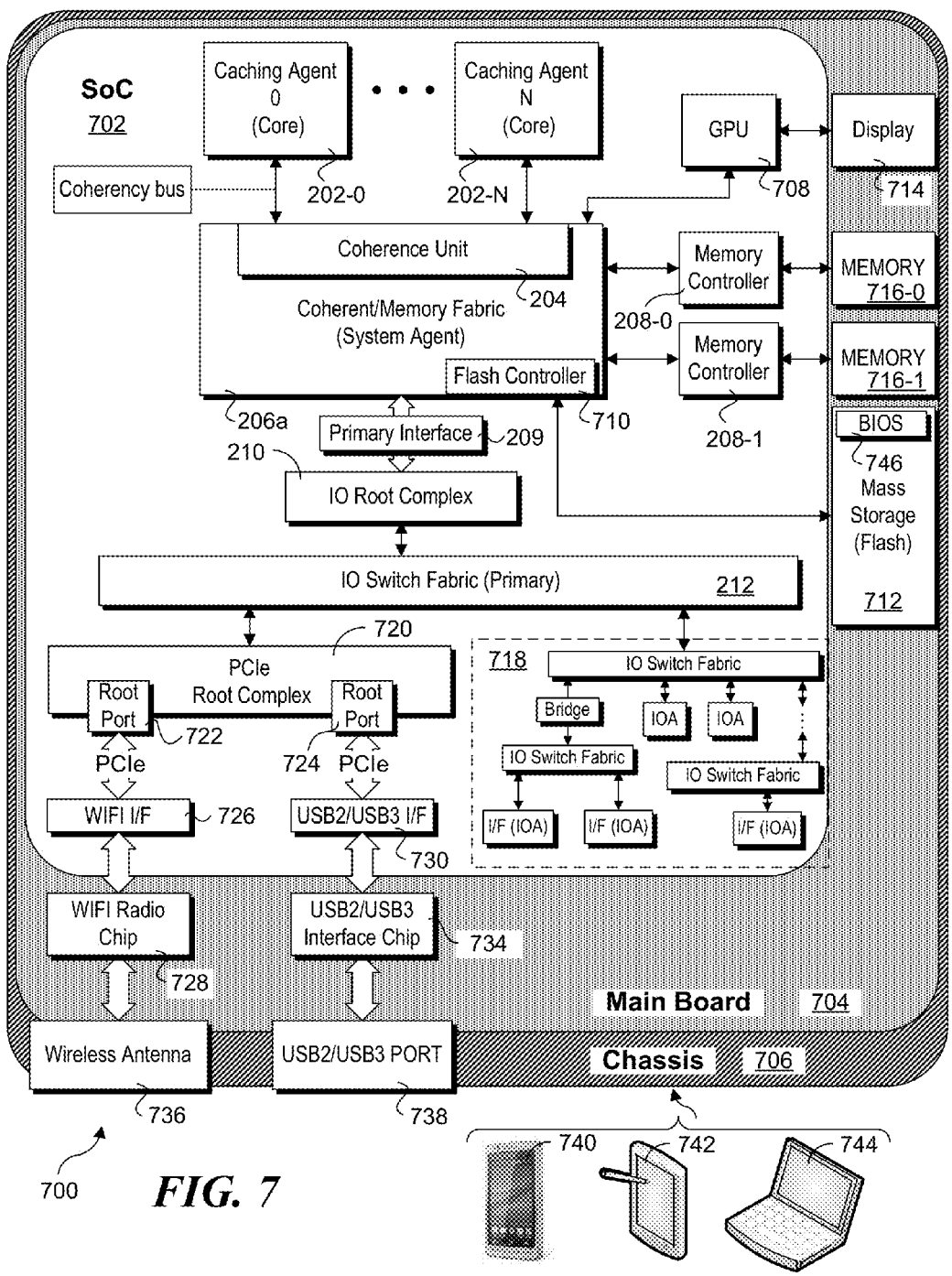
FIG. 7 illustrates an embodiment of a block diagram of a system architecture under which various aspects of the embodiments disclosed herein are implemented.

Aspects of the embodiments described and illustrated herein may be implemented in various system architectures, as described above. By way of example and without limitation, a system 700 implementing aspects of the embodiments are shown in FIG. 7. System 700 includes an SoC 702 mounted on or otherwise coupled to a main board 704 in chassis 706. SoC comprises a multicore processor employing architectural aspects and logic similar to that illustrated in FIGS. 2-6 and described above, wherein similar components share common reference numbers. These include cores 202-0 through 202-N, a system agent 206a including a distributed coherent and memory fabric and a coherence unit 204, primary interface 209, IO Root Complex 210, and primary IO switch fabric 212.

In one embodiment, the distributed coherent and memory fabric comprises the pipeline architectures illustrated in FIGS. 3 and 4, as described above. In addition, a system agent may be configured to facilitate various other operations, such as interfacing to other components. In addition to memory controllers 208-0 and 208-1, these include an interface (not shown) to a Graphics Processing Unit (GPU) 708 and a flash controller 710 coupled to a mass storage device 712 comprising flash memory. GPU 708 is configured to interface to a display 714, such as an LCD-type display. In some embodiments, display 714 comprises a touch screen display, and SoC includes further circuitry for facilitating touchscreen operations (see further details below regarding FIG. 9).

Memory controllers 208-0 and 208-1 are respectively coupled to memory 716-0 and 716-1, which collectively comprise system memory for system 700. Generally, memory controllers 208-0 and 208-1 may be integrated on SoC 702 (as shown), may be implemented off-chip (i.e., separate from SoC 702), either as separate components or integrated in memories 716-0 and 716-1. Similarly, GPU 708 may be integrated on SoC 702 or comprise an off-chip component.

As described above, primary IO switch fabric 212 sits at the top of an IO interconnect hierarchy including two or more switch fabrics. For convenience and clarity, a portion of the interconnect hierarchy depicted below the right-hand side of primary IO switch fabric 212 is labeled 718, and comprises an IO interconnect sub-hierarchy comprising one or more switch fabrics to which various IO devices and IO agents are coupled. These include IO agents that are implemented as interfaces in blocks labeled IF (IOA).

Depicted below the left-hand side of primary IO switch fabric 212 is a PCIe root complex 720 including a pair of PCIe root ports 722 and 724. PCIe root port 722 facilitates communication (over a PCIe interconnect an using the PCIe protocol) with an on-chip IEEE 802.11 (aka "WiFi") interface 726 that is coupled to an WiFi radio chip 728 mounted on main board 704. Similarly, PCIe root port 724 facilitates communication with a Universal Serial Bus (USB) 2 or USB3 interface 730 that is coupled to a USB2/USB3 interface chip 734 on main board 704. WiFi radio chip 728 is coupled to an antenna 736, while USB2/USB3 interface chip 734 is coupled to a USB2/USB3 port 738.

As depicted towards the bottom of FIG. 7, system 700 is illustrated of a system architecture that may be implemented in devices such as but not limited to a mobile phone 740, a tablet 742, and a portable computer (e.g., a notebook, laptop or Ultrabook™) 744. In addition to the illustrated components in system 700, one of skill in the art will recognize that other components will typically be included in a particular device, such as a mobile radio subsystem for a mobile phone, keyboard for a portable computer, etc. Moreover, each device will employ a power sub-system, power management logic (e.g., implemented on SoC 702) and may typically support other types of communication ports, such as a Thunderbolt™ port, external display ports (e.g., HDMI, DVI port, Miniport or DisplayPort), an Ethernet port, etc.

During an initialization operation in response to a power-on event or reset, firmware such as depicted by BIOS 746 is loaded into a protected portion of system memory and used to initialize and configure various system components, including the system agent, and the IO interconnect hierarchy switch fabrics, bridges and interfaces. As used herein, various endpoint components or devices are operatively coupled to other system components via use of the switch fabrics, bridges, interfaces, and IO agents and use of corresponding protocols applicable to the particular interconnect architecture. These interconnect structures and protocols facilitate virtual connections between components during operation of SoC 702 and system 700.

Figure 8:
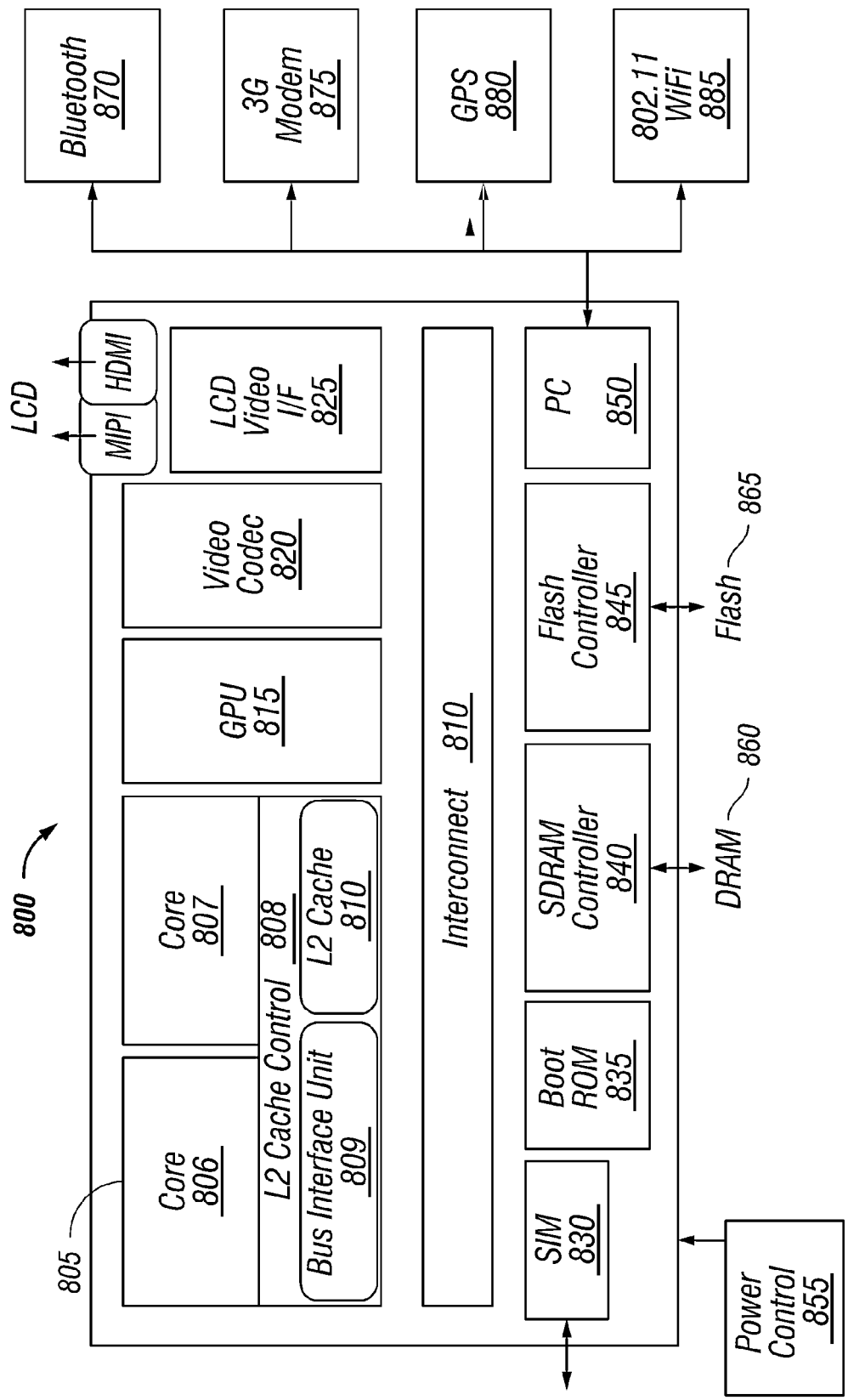
FIG. 8 illustrates an embodiment of a computing system on a chip.

Turning next to FIG. 8, an embodiment of a system on-chip (SOC) design in accordance with the inventions is depicted.

As a specific illustrative example, SOC 800 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 800 includes 2 cores—806 and 807. Similar to the discussion above, cores 806 and 807 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 806 and 807 are coupled to cache control 808 that is associated with bus interface unit 809 and L2 cache 810 to communicate with other parts of system 800. Interconnect 810 includes an on-chip interconnect, such as an IOSF, AMBA, or other interconnect discussed above, which potentially implements one or more aspects of the described invention.

Interface 810 provides communication channels to the other components, such as a Subscriber Identity Module (SIM) 830 to interface with a SIM card, a boot rom 835 to hold boot code for execution by cores 806 and 807 to initialize and boot SOC 800, a SDRAM controller 840 to interface with external memory (e.g. DRAM 860), a flash controller 845 to interface with non-volatile memory (e.g. Flash 865), a peripheral control Q1650 (e.g. Serial Peripheral Interface) to interface with peripherals, video codecs 820 and Video interface 825 to display and receive input (e.g. touch enabled input), GPU 815 to perform graphics related computations, etc. Any of these interfaces may incorporate aspects of the invention described herein.

In addition, the system illustrates peripherals for communication, such as a Bluetooth module 870, 3G modem 875, GPS 885, and WiFi 885. Note as stated above, a UE includes a radio for communication. As a result, these peripheral communication modules are not all required. However, in a UE some form a radio for external communication is to be included.

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 9:
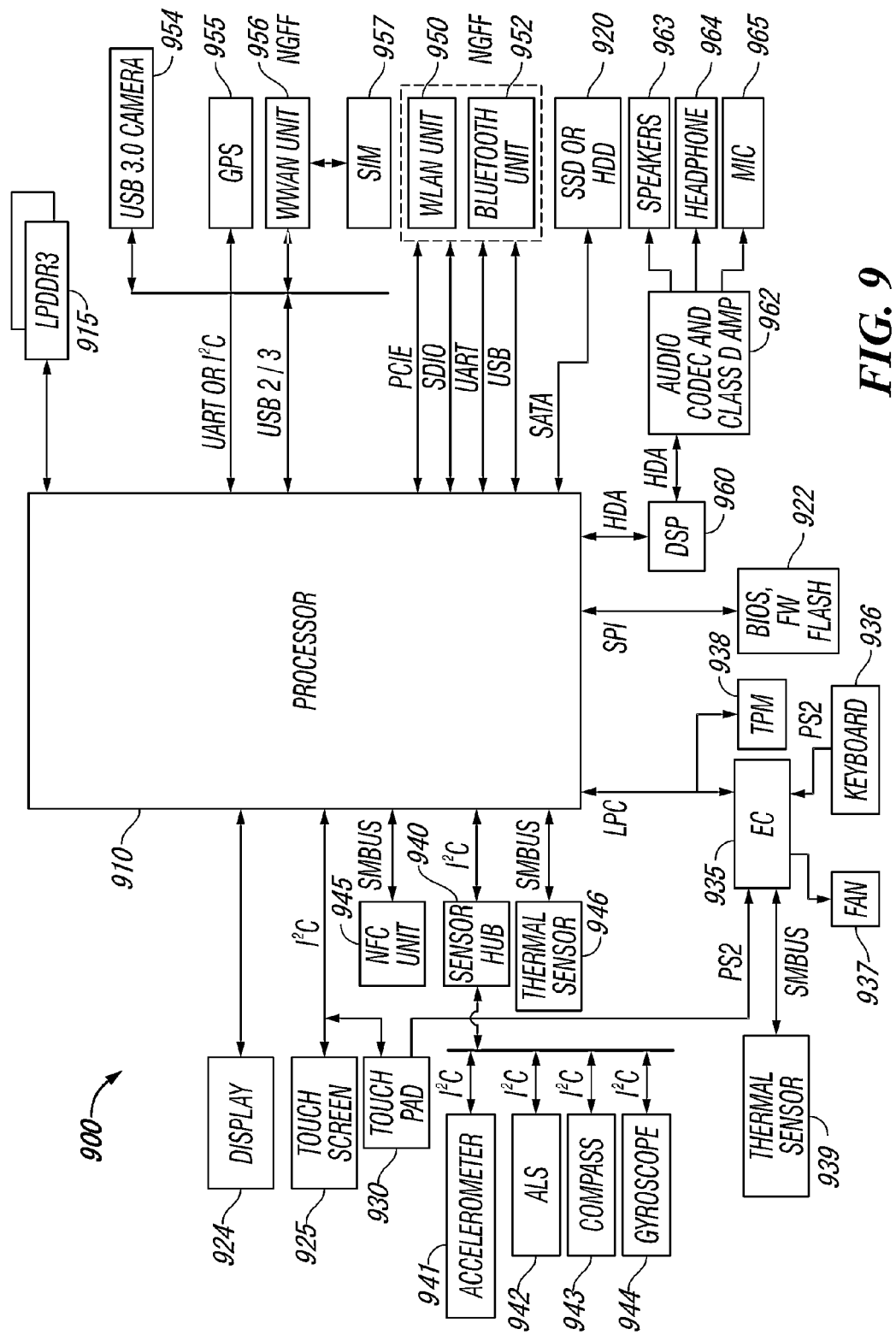
FIG. 9 illustrates an embodiment of a block diagram for a computing system.

Referring now to FIG. 9, a block diagram of components present in a computer system in accordance with an embodiment of the present invention is illustrated. As shown in FIG. 9, system 900 includes any combination of components. These components may be implemented as ICs, portions thereof, discrete electronic devices, or other modules, logic, hardware, software, firmware, or a combination thereof adapted in a computer system, or as components otherwise incorporated within a chassis of the computer system. Note also that the block diagram of FIG. 9 is intended to show a high level view of many components of the computer system. However, it is to be understood that some of the components shown may be omitted, additional components may be present, and different arrangement of the components shown may occur in other implementations. As a result, the invention described above may be implemented in any portion of one or more of the interconnects illustrated or described below.

As seen in FIG. 9, a processor 910, in one embodiment, includes a microprocessor, multi-core processor, multi-threaded processor, an ultra low voltage processor, an embedded processor, or other known processing element. In the illustrated implementation, processor 910 acts as a main processing unit and central hub for communication with many of the various components of the system 900. As one example, processor 900 is implemented as a system on a chip (SoC). As a specific illustrative example, processor 910 includes an Intel® Architecture Core™-based processor such as an i3, i5, i7 or another such processor available from Intel Corporation, Santa Clara, Calif. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instructions set that performs defined algorithms as set forth by the processor licensor. Here, the microarchitectural implementation may vary, but the architectural function of the processor is usually consistent. Certain details regarding the architecture and operation of processor 910 in one implementation will be discussed further below to provide an illustrative example.

Processor 910, in one embodiment, communicates with a system memory 915. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (Q17P). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMMs, Mini-DIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 920 may also couple to processor 910. In various embodiments, to enable a thinner and lighter system design as well as to improve system responsiveness, this mass storage may be implemented via a SSD. However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 9, a flash device 922 may be coupled to processor 910, e.g., via a serial peripheral interface (SPI). This flash device may provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320 GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In a SSD-only option, the module may be accommodated in various locations such as in a mSATA or NGFF slot. As an example, an SSD has a capacity ranging from 120 GB-1TB.

Various input/output (IO) devices may be present within system 900. Specifically shown in the embodiment of FIG. 9 is a display 924 which may be a high definition LCD or LED panel configured within a lid portion of the chassis. This display panel may also provide for a touch screen 925, e.g., adapted externally over the display panel such that via a user's interaction with this touch screen, user inputs can be provided to the system to enable desired operations, e.g., with regard to the display of information, accessing of information and so forth. In one embodiment, display 924 may be coupled to processor 910 via a display interconnect that can be implemented as a high performance graphics interconnect. Touch screen 925 may be coupled to processor 910 via another interconnect, which in an embodiment can be an I²C interconnect. As further shown in FIG. 9, in addition to touch screen 925, user input by way of touch can also occur via a touch pad 930 which may be configured within the chassis and may also be coupled to the same I²C interconnect as touch screen 925.

The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode the system is folded shut such that the back display surface of the display panel comes to rest in a position such that it faces outwardly towards a user, when the bottom surface of the base panel is rested on a surface or held by the user. In the tablet mode of operation, the back display surface performs the role of a display and user interface, as this surface may have touch screen functionality and may perform other known functions of a conventional touch screen device, such as a tablet device. To this end, the display panel may include a transparency-adjusting layer that is disposed between a touch screen layer and a front display surface. In some embodiments the transparency-adjusting layer may be an electrochromic layer (EC), a LCD layer, or a combination of EC and LCD layers.

In various embodiments, the display can be of different sizes, e.g., an 11.6" or a 13.3" screen, and may have a 16:9 aspect ratio, and at least 300 nits brightness. Also the display may be of full high definition (HD) resolution (at least 1920× 1080p), be compatible with an embedded display port (eDP), and be a low power panel with panel self refresh.

As to touch screen capabilities, the system may provide for a display multi-touch panel that is multi-touch capacitive and being at least 5 finger capable. And in some embodiments, the display may be 10 finger capable. In one embodiment, the touch screen is accommodated within a damage and scratch-resistant glass and coating (e.g., Gorilla Glass™ or Gorilla Glass 2™) for low friction to reduce "finger burn" and avoid "finger skipping". To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 200 ms (lag on finger to pointer). The display, in some implementations, supports edge-to-edge glass with a minimal screen bezel that is also flush with the panel surface, and limited IO interference when using multi-touch.

For perceptual computing and other purposes, various sensors may be present within the system and may be coupled to processor 910 in different manners. Certain inertial and environmental sensors may couple to processor 910 through a sensor hub 940, e.g., via an I²C interconnect. In the embodiment shown in FIG. 9, these sensors may include an accelerometer 941, an ambient light sensor (ALS) 942, a compass 943 and a gyroscope 944. Other environmental sensors may include one or more thermal sensors 946 which in some embodiments couple to processor 910 via a system management bus (SMBus) bus.

Using the various inertial and environmental sensors present in a platform, many different use cases may be realized. These use cases enable advanced computing operations including perceptual computing and also allow for enhancements with regard to power management/battery life, security, and system responsiveness.

For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time clock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS may be a Microsoft® Windows® 8 OS that implements Connected Standby (also referred to herein as Win8 CS). Windows 8 Connected Standby or another OS having a similar state can provide, via a platform as described herein, very low ultra idle power to enable applications to remain connected, e.g., to a cloud-based location, at very low power consumption. The platform can supports 3 power states, namely screen on (normal); Connected Standby (as a default "off" state); and shutdown (zero watts of power consumption). Thus in the Connected Standby state, the platform is logically on (at minimal power levels) even though the screen is off. In such a platform, power management can be made to be transparent to applications and maintain constant connectivity, in part due to offload technology to enable the lowest powered component to perform an operation.

Also seen in FIG. 9, various peripheral devices may couple to processor 910 via a low pin count (LPC) interconnect. In the embodiment shown, various components can be coupled through an embedded controller 935. Such components can include a keyboard 936 (e.g., coupled via a PS2 interface), a fan 937, and a thermal sensor 939. In some embodiments, touch pad 930 may also couple to EC 935 via a PS2 interface. In addition, a security processor such as a trusted platform module (TPM) 938 in accordance with the Trusted Computing Group (TCG) TPM Specification Version 1.2, dated Oct. 2, 2003, may also couple to processor 910 via this LPC interconnect. However, understand the scope of the present invention is not limited in this regard and secure processing and storage of secure information may be in another protected location such as a static random access memory (SRAM) in a security coprocessor, or as encrypted data blobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with the Universal Serial Bus Revision 3.0 Specification (November 2008), with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 900 can communicate with external devices in a variety of manners, including wirelessly. In the embodiment shown in FIG. 9, various wireless modules, each of which can correspond to a radio configured for a particular wireless communication protocol, are present. One manner for wireless communication in a short range such as a near field may be via a near field communication (NFC) unit 945 which may communicate, in one embodiment with processor 910 via an SMBus. Note that via this NFC unit 945, devices in close proximity to each other can communicate. For example, a user can enable system 900 to communicate with another (e.g.,) portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 9, additional wireless units can include other short range wireless engines including a WLAN unit 950 and a Bluetooth unit 952. Using WLAN unit 950, Wi-Fi™ communications in accordance with a given Institute of Electrical and Electronics Engineers (IEEE) 802.11 standard can be realized, while via Bluetooth unit 952, short range communications via a Bluetooth protocol can occur. These units may communicate with processor 910 via, e.g., a USB link or a universal asynchronous receiver transmitter (UART) link. Or these units may couple to processor 910 via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 956 which in turn may couple to a subscriber identity module (SIM) 957. In addition, to enable receipt and use of location information, a GPS module 955 may also be present. Note that in the embodiment shown in FIG. 9, WWAN unit 956 and an integrated capture device such as a camera module 954 may communicate via a given USB protocol such as a USB 2.0 or 3.0 link, or a UART or I$^2$C protocol. Again the actual physical connection of these units can be via adaptation of a NGFF add-in card to an NGFF connector configured on the motherboard.

In a particular embodiment, wireless functionality can be provided modularly, e.g., with a WiFi™ 802.11ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition NFC support may be provided via a separate device or multi-function device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 960, which may couple to processor 910 via a high definition audio (HDA) link. Similarly, DSP 960 may communicate with an integrated coder/decoder (CODEC) and amplifier 962 that in turn may couple to output speakers 963 which may be implemented within the chassis. Similarly, amplifier and CODEC 962 can be coupled to receive audio inputs from a microphone 965 which in an embodiment can be implemented via dual array microphones (such as a digital microphone array) to provide for high quality audio inputs to enable voice-activated control of various operations within the system. Note also that audio outputs can be provided from amplifier/CODEC 962 to a headphone jack 964. Although shown with these particular components in the embodiment of FIG. 9, understand the scope of the present invention is not limited in this regard.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor 910 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

In one embodiment, a sustain power plane can be used during some deep sleep states to power on the I/O pins for several I/O signals, such as the interface between the processor and a PCH, the interface with the external VR and the interface with EC 935. This sustain power plane also powers an on-die voltage regulator that supports the on-board SRAM or other cache memory in which the processor context is stored during the sleep state. The sustain power plane is also used to power on the processor's wakeup logic that monitors and processes the various wakeup source signals.

During power management, while other power planes are powered down or off when the processor enters certain deep sleep states, the sustain power plane remains powered on to support the above-referenced components. However, this can lead to unnecessary power consumption or dissipation when those components are not needed. To this end, embodiments may provide a connected standby sleep state to maintain processor context using a dedicated power plane. In one embodiment, the connected standby sleep state facilitates processor wakeup using resources of a PCH which itself may be present in a package with the processor. In one embodiment, the connected standby sleep state facilitates sustaining processor architectural functions in the PCH until processor wakeup, this enabling turning off all of the unnecessary processor components that were previously left powered on during deep sleep states, including turning off all of the clocks. In one embodiment, the PCH contains a time stamp counter (TSC) and connected standby logic for controlling the system during the connected standby state. The integrated voltage regulator for the sustain power plane may reside on the PCH as well.

In an embodiment, during the connected standby state, an integrated voltage regulator may function as a dedicated power plane that remains powered on to support the dedicated cache memory in which the processor context is stored such as critical state variables when the processor enters the deep sleep states and connected standby state. This critical state may include state variables associated with the architectural, micro-architectural, debug state, and/or similar state variables associated with the processor.

The wakeup source signals from EC 935 may be sent to the PCH instead of the processor during the connected standby state so that the PCH can manage the wakeup processing instead of the processor. In addition, the TSC is maintained in the PCH to facilitate sustaining processor architectural functions. Although shown with these particular components in the embodiment of FIG. 9, understand the scope of the present invention is not limited in this regard.

Power control in the processor can lead to enhanced power savings. For example, power can be dynamically allocate between cores, individual cores can change frequency/voltage, and multiple deep low power states can be provided to enable very low power consumption. In addition, dynamic control of the cores or independent core portions can provide for reduced power consumption by powering off components when they are not being used.

Some implementations may provide a specific power management IC (PMIC) to control platform power. Using this solution, a system may see very low (e.g., less than 5%) battery degradation over an extended duration (e.g., 16 hours) when in a given standby state, such as when in a Win8 Connected Standby state. In a Win8 idle state a battery life exceeding, e.g., 9 hours may be realized (e.g., at 150 nits). As to video playback, a long battery life can be realized, e.g., full HD video playback can occur for a minimum of 6 hours. A platform in one implementation may have an energy capacity of, e.g., 35 watt hours (Whr) for a Win8 CS using an SSD and (e.g.,) 40-44 Whr for Win8 CS using an HDD with a RST cache configuration.

A particular implementation may provide support for 15 W nominal CPU thermal design power (TDP), with a configurable CPU TDP of up to approximately 25 W TDP design point. The platform may include minimal vents owing to the thermal features described above. In addition, the platform is pillow-friendly (in that no hot air is blowing at the user). Different maximum temperature points can be realized depending on the chassis material. In one implementation of a plastic chassis (at least having to lid or base portion of plastic), the maximum operating temperature can be 52 degrees Celsius (C). And for an implementation of a metal chassis, the maximum operating temperature can be 46° C.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display.

The embodiments described herein provide several advantages and differences relative to current systems. The distributed coherent and memory fabric architecture facilitates concurrent access to caching agents and non-caching IO agents through use of parallel pipelines, including support for shared access to cachelines by both caching and non-caching agents while maintaining memory coherency and enforcing correct ordering. The use of parallel pipelines facilities greater memory throughput than available under conventional architectures employing a single pipeline. By providing shared access to memory resources for both caching and non-caching agents, the architectures offer improvements over existing approaches employing separate pipelines for caching and non-caching agents that are operated independently and do not provide shared access. By decoupling address match hardware and ordering hardware, the architectures enable high performance, distributed conflict checking for I/O requests while retaining correct ordering behavior. By mapping multiple virtual channels to fewer conflict classes using the described method above, the architectures reduce the area overhead associated that typical systems normally incur with dedicated resources for each virtual channel, while achieving the required QoS.

While the embodiments described and illustrated herein focus on address conflicts, embodiments of this invention may include other types of conflict checks such as resource conflicts due to a full shared resource unavailable to any agent, or resource conflicts within the same agent such as oversubscription of resources.

The following examples pertain to further embodiments. In an embodiment, a method is implemented within a computer system having system memory. Memory access requests originating from a plurality of caching agents and a plurality of I/O agents in the computer system are received, each memory access request identifying an address of at least one cacheline for which access is requested, wherein at least one portion of the system memory may be accessed by both at least one caching agent and an I/O agent. Multiple of the memory access requests are concurrently serviced via a distributed memory fabric employing parallel pipelines while maintaining memory coherency for cachelines associated with the caching agents and enforcing memory access ordering for memory access requests originating from I/O agents.

In an embodiment of the method, the memory access requests from the I/O agents are sent via a plurality of virtual channels, and wherein enforcing memory access ordering for memory access requests originating from I/O agents comprises enforcing memory access ordering such that that requests from I/O agents that are sent via the same virtual channel appear to be serviced in the order they are received at the distributed memory fabric.

In an embodiment of the method, an address conflict check is performed for each memory access request originating from a caching agent to determine whether the request conflicts with a previous memory access request for which service is pending. If an address conflict check is detected, the request in a caching agent conflict queue is enqueued; otherwise the request is permitted to proceed.

In an embodiment, first and second pipelines are implemented in the distributed memory fabric. For each of the first and second pipelines, conflict check logic is implemented at each pipeline and requests are enqueued for which an address conflict is detected in a caching agent conflict queue associated with that pipeline.

In an embodiment, a scoreboard is implemented for each of the first and second pipelines to track pending memory access requests that have been admitted to proceed in the pipeline. Additionally, for each memory access request received at each pipeline, a determination is made to whether an address conflict exists by comparing addresses of cachelines corresponding to memory access requests in the caching agent conflict queue and the scoreboard associated with the pipeline to an address of a cacheline contained in the memory access request.

In an embodiment of the method, a plurality of virtual channels are employed to send memory access requests from I/O agents, each memory access request being sent over a virtual channel associated with the request. An address conflict check is performed for each memory access request originating from an I/O agent to determine whether the request conflicts with a pending memory access request, and if an address conflict is detected, the request is identified as a conflicting request and performing a conflict ordering operation to order the conflicting request relative to other pending requests associated with the same virtual channel so as to preserve the same order in which the requests were received via the virtual channel, and the conflicting request is enqueued in an I/O conflict queue associated with the virtual channel.

In an embodiment, each virtual channel is mapped to a class, wherein the number of classes is less than the number of virtual channels, and conflicting requests are enqueued in a plurality of service class I/O conflict queues based on the service class to which the virtual channel associated with each conflicting requests is mapped.

In an embodiment, first and second pipelines are implemented in the distributed memory fabric. For each of the first and second pipelines, in parallel, an address conflict check for a memory access request originating from an I/O agent is performed to determine whether the request conflicts with a pending memory access request, and if there is no address conflict for each of the memory access requests being processed by the first and second pipelines for a given cycle, both of the requests are admitted for further processing by its associated pipeline.

In an embodiment, operations are performed by each of the first and second pipelines in parallel. The operations include performing an address conflict check for a memory access request originating from an I/O agent to determine whether the request conflicts with a pending memory access request, and, if there is an address conflict for one of the memory access requests being processed by the first and second pipelines for a given cycle, determining a relative age for the two requests. If an older of the two requests does not have an address conflict and a younger request does have an address conflict, admitting the older request for further processing by its associated pipeline.

In an embodiment of the method the operations further include enqueuing the younger request in an I/O conflict queue, and notifying the pipeline associated with the older request that future requests to the same virtual channel associated with the younger request are to be enqueued in the I/O conflict queue until the younger request is admitted for further processing by its associated pipeline.

In an embodiment, a plurality of virtual channels are employed to send memory access requests from I/O agents, each memory access request being sent over a virtual channel associated with the request. For each of the first and second pipelines, operations are performed in parallel, including performing an address conflict check for a memory access request originating from an I/O agent to determine whether the request conflicts with a pending memory access request, and, if there is an address conflict for one of the memory access requests being processed by the first and second pipelines for a given cycle, determining a relative age for the two requests. If an older of the two requests has an address conflict and both of the requests are sent via the same virtual channel, enqueuing both requests to the same I/O conflict queue with the older request preceding the younger request.

In an embodiment of the method, operations are performed by the first and second pipelines, in parallel. The operations include performing an address conflict check for a memory access request originating from an I/O agent to determine whether the request conflicts with a pending memory access request, the memory access request sent over a virtual channel from among multiple virtual channels implemented for sending requests from I/O agents; and, if there is an address conflict for one of the memory access requests being processed by the first and second pipelines for a given cycle, determining a relative age for the two requests. If an older of the two requests has an address conflict and the requests are sent via the different virtual channels, admitting the younger request for further processing by its associated pipeline. In an embodiment, the method further includes enqueuing the older request in an I/O conflict queue; and notifying the pipeline associated with the younger request that future requests to the same virtual channel associated with the older request are to be enqueued in the I/O conflict queue until the older request is admitted for further processing by its associated pipeline.

In an embodiment, the method includes employing a hash algorithm on data contained in a memory access request to route memory access requests to one of the first or second pipelines for further processing. In an embodiment, arbitration is performed for each of a plurality of cycles, wherein a plurality of memory access requests are received as inputs to an arbiter, the inputs including a plurality of inputs associated with memory access requests originating from caching agents and at least one input associated with memory access requests originating from I/O agents. For each cycle, an arbitration cycle winner and forwarding the arbitration cycle winner to logic configured to implement the hash algorithm. In one embodiment, the inputs to the arbiter further include at least one input corresponding to memory access requests that were previously arbitrated by the arbiter and for which an address conflict was detected. In another embodiment an anti-starvation mechanism is implemented and configured to prevent memory access requests from being repeatedly blocked over multiple conflict check cycles for the same memory access request.

In accordance with further embodiments, apparatus are configured with means for performing the foregoing method operations. In an embodiment, the apparatus includes an memory access request arbiter, configured to grant a memory access request from among a plurality of input memory access requests including, memory access requests originating from a plurality of caching agents, memory access requests originating from a plurality of I/O agents, and conflicting memory access requests, previously arbitrated by the arbiter, wherein each memory access request identifies an address of a cacheline for which access is requested. The apparatus further includes a distributed memory fabric including a plurality of pipelines configured to operate in parallel, at least one caching agent conflict queue, at least one I/O conflict queue, and address conflict handling logic, configured to determine if a currently-evaluated memory access request is in conflict with another pending memory access request and configured to enqueue conflicting memory access requests from caching agents in the at least one caching agent conflict queue and enqueue conflicting memory access requests from I/O agents in the at least one I/O agent conflict queue.

In an embodiment, the distributed memory fabric comprises a distributed coherence and memory fabric including a plurality of coherence pipelines, each coherence pipeline operatively coupled to an associated memory fabric pipeline, wherein each coherence pipeline is configured to facilitate memory coherence for memory access requests originating from caching agents.

In an embodiment, memory access requests originating from I/O agents are sent over a plurality of virtual channels, and the apparatus further includes conflict ordering logic, configured to ensure that pending memory access requests sent over the same virtual channel appear to be processed in the order they are originally granted by the memory access request arbiter.

In an embodiment of the apparatus, the address conflict handling logic includes address conflict check logic for each memory fabric pipeline and the at least one caching agent conflict queue comprises a caching agent queue associated with each pipeline. In an embodiment, each memory fabric pipeline includes an admitted pool in which admitted memory requests are buffered and a scoreboard in which addresses of the admitted memory requests are stored. In an embodiment, the address conflict check logic in each memory fabric pipeline is configured to determine whether an address conflict exists by comparing addresses of cachelines corresponding to memory access requests in its associated caching agent conflict queue and its scoreboard to an address of a cacheline referenced in the currently-evaluated memory access request.

In an embodiment, the apparatus further includes a conflict queue arbiter configured to arbitrate conflicting memory access requests in the at least one caching agent conflict queue and the at least one I/O conflict queue, wherein an output of the conflict queue arbiter is coupled to an input of the memory access request arbiter.

In an embodiment, the at least one I/O conflict queue comprises a plurality of per-class I/O conflict queues, and each virtual channel is assigned to a class. In an embodiment, the apparatus further includes a plurality of queues coupled to respective inputs of the memory access request arbiter, including, a plurality of caching agent request queues, each configured to queue requests from a respective caching agent, and an I/O request queue, configured to queue requests from the plurality of I/O agents. In an embodiment, the apparatus further includes an anti-starvation mechanism configured to prevent memory access requests from being repeatedly blocked over multiple conflict check cycles for the same memory access request.

In an embodiment, an apparatus includes, a plurality of processor cores, each having at least one associated caching agent, a system agent; operatively coupled to each of the processor cores, including a distributed and coherent memory fabric comprising a plurality of coherency pipelines and a plurality of memory fabric pipelines, each memory fabric pipeline configured to interface with a respective memory controller, an I/O root complex, operatively coupled to the system agent, an I/O interconnect hierarchy, including at least one switch fabric communicatively coupled to the I/O root complex, and a plurality of I/O agents, each coupled to a switch fabric in the I/O interconnect hierarchy. Upon installation of the apparatus in a computer system including system memory accessed via respective memory controllers coupled to the plurality of memory fabric pipelines and operation of the computer system the apparatus is configured to concurrently service memory access requests to access cachelines originating from the plurality of caching agents and the plurality of I/O agents while maintaining memory coherency for cachelines associated with caching agents, wherein a portion of the cachelines are accessible to both at least one caching agent and at least one I/O agent.

In an embodiment, the apparatus is configured to enforce memory access ordering for memory access requests originating from I/O agents. In an embodiment, each memory fabric pipeline includes an admitted pool in which admitted memory requests are buffered, a scoreboard in which addresses of the admitted memory requests are stored, and an associated caching agent conflict queue, and the apparatus further includes address conflict check logic for each memory fabric pipeline that is configured to determine whether an address conflict exists by comparing addresses of cachelines corresponding to memory access requests in its associated caching agent conflict queue and its scoreboard to an address of a cacheline referenced in the currently-evaluated memory access request.

In an embodiment of the apparatus the system agent further includes at least one caching agent conflict queue, at least one I/O conflict queue, and address conflict handling logic, configured to determine if a currently-evaluated memory access request is in conflict with another pending memory access request and configured to enqueue conflicting memory access requests from caching agents in the at least one caching agent conflict queue and enqueue conflicting memory access requests from I/O agents in the at least one I/O agent conflict queue. In an embodiment the system agent further includes a conflict queue arbiter configured to arbitrate conflicting memory access requests in the at least one caching agent conflict queue and the at least one I/O conflict queue. In an embodiment, upon installation of the apparatus in the computer system and operation of the computer system the apparatus is configured to facilitate communication between I/O agents and the system agent via a plurality of virtual channels having an associated class, wherein the at least one I/O conflict queue comprises a plurality of per-class I/O conflict queues, and wherein the number of classes is less than the number of virtual channels. In an embodiment, the system agent further includes an memory access request arbiter, configured to grant a memory access request from among a plurality of input memory access requests including, memory access requests originating from the plurality of caching agents, memory access requests originating from the plurality of Input/Output (I/O) agents, and conflicting memory access requests, previously arbitrated by the arbiter.

In an embodiment of an apparatus, the apparatus comprises an integrated circuit including a plurality of caching agents, a plurality of I/O agents, and a distributed memory fabric. The distributed memory fabric includes at least two pipelines and is configured to receive a plurality of requests from the plurality of caching agents and the plurality of I/O agents, wherein each pipeline includes a first conflict storage and a second conflict storage. Each pipeline further to: admit a particular request of the plurality of requests, in response to determining no address conflict exists between the particular request and one or more pending requests of the plurality of requests; and direct, the particular request, in response to determining an address conflict exists between the particular request and one or more pending requests, to the first conflict storage or the second conflict storage based on whether the particular request originated from one of the plurality of caching agents or one of the plurality of I/O agents.

In accordance with further embodiments systems are disclosed for implementing the foregoing methods. In an embodiment, a system includes a main board, and a multicore processor, coupled to or mounted on the main board, including a system agent; operatively coupled to each of the processor cores, including a distributed and coherent memory fabric comprising a plurality of coherency pipelines and a plurality of memory fabric pipelines, each memory fabric pipeline configured to interface with a respective memory controller, an I/O root complex, operatively coupled to the system agent, an I/O interconnect hierarchy, including at least two switch fabrics communicatively coupled to the I/O root complex, and a plurality of I/O interfaces, each coupled to a switch fabric and including an I/O agent. The system further includes at least two memory devices, coupled to or mounted on the main board, configured as first and second blocks of system memory, first and second memory controllers, operatively coupled to respective memory fabric pipelines, each coupled to at least one memory device and configured to access a respective block of system memory, a plurality of I/O devices coupled to or mounted on the main board and coupled to a respective I/O interface, and flash memory, coupled to the multicore processor, having BIOS instructions stored therein to configure the multicore processor. Upon operation of the system the multicore processor facilitates concurrent servicing of memory access requests to access cachelines originating from the plurality of caching agents and the plurality of I/O agents while maintaining memory coherency for cachelines associated with caching agents, wherein a portion of the cachelines are accessible to both at least one caching agent and at least one I/O agent.

In an embodiment, upon operation of the system the multicore processor is configured to enforce memory access ordering for memory access requests originating from I/O agents. In the system, each memory fabric pipeline includes an admitted pool in which admitted memory requests are buffered, a scoreboard in which addresses of the admitted memory requests are stored, and an associated caching agent conflict queue, and the system further includes address conflict check logic for each memory fabric pipeline that is configured to determine whether an address conflict exists by comparing addresses of cachelines corresponding to memory access requests in its associated caching agent conflict queue and its scoreboard to an address of a cacheline referenced in the currently-evaluated memory access request.

In an embodiment of the system, the system agent further includes at least one caching agent conflict queue, at least one I/O conflict queue, and address conflict handling logic, configured to determine if a currently-evaluated memory access request is in conflict with another pending memory access request and configured to enqueue conflicting memory access requests from caching agents in the at least one caching agent conflict queue and enqueue conflicting memory access requests from I/O agents in the at least one I/O agent conflict queue.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a non-transient machine readable medium.

A module or component as used herein refers to any combination of hardware, software, and/or firmware. As an example, a module or component includes hardware, such as a micro-controller, associated with a non-transitory medium to store code adapted to be executed by the micro-controller. Therefore, reference to a module or a component, in one embodiment, refers to the hardware, which is specifically configured to recognize and/or execute the code to be held on a non-transitory medium. Furthermore, in another embodiment, use of a module or component refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module and/or component boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
a plurality of hardware-based caching agents, each associated with a respective physical processor core;
a hardware-based memory access request arbiter, configured to grant a memory access request from among a plurality of input memory access requests including,
memory access requests originating from the plurality of caching agents;
memory access requests originating from a plurality of hardware-based Input/Output (I/O) agents; and
conflicting memory access requests, previously arbitrated by the arbiter,
each memory access request identifying an address associated with a cacheline for which access is requested;
a distributed memory fabric including a plurality of pipelines configured to operate in parallel;
at least one hardware-based caching agent conflict queue;
at least one hardware-based I/O conflict queue, separate from the at least one hardware-based caching agent conflict queue; and
hardware-based address conflict handling logic, configured to determine if a currently-evaluated memory access request is in conflict with another pending memory access request and configured to enqueue conflicting memory access requests from caching agents in the at least one caching agent conflict queue and enqueue conflicting memory access requests from I/O agents in the at least one I/O agent conflict queue, wherein the at least one caching agent conflict queue only stores conflicting memory access requests from caching agents and the at least one I/O agent conflict queue only stores conflicting memory access requests from I/O agents.

2. The apparatus of claim 1, further wherein the distributed memory fabric comprises a distributed coherence and memory fabric including a plurality of coherence pipelines, each coherence pipeline operatively coupled to an associated memory fabric pipeline, wherein each coherence pipeline is configured to facilitate memory coherence for memory access requests originating from caching agents.

3. The apparatus of claim 1, wherein memory access requests originating from I/O agents are sent over a plurality of virtual channels, the apparatus further comprising hardware-based conflict ordering logic, configured to ensure that pending memory access requests sent over the same virtual channel appear to be processed in the order they are originally granted by the memory access request arbiter.

4. The apparatus of claim 1, wherein the address conflict handling logic includes hardware-based address conflict check logic for each memory fabric pipeline and the at least one caching agent conflict queue comprises a caching agent queue associated with each pipeline.

5. The apparatus of claim 4, wherein each memory fabric pipeline includes an admitted pool in which admitted memory requests are buffered and a scoreboard in which addresses of the admitted memory requests are stored.

6. The apparatus of claim 5, wherein the address conflict check logic in each memory fabric pipeline is configured to determine whether an address conflict exists by comparing addresses of cachelines corresponding to memory access requests in its associated caching agent conflict queue and its scoreboard to an address of a cacheline referenced in the currently-evaluated memory access request.

7. The apparatus of claim 1, further comprising a hardware-based conflict queue arbiter configured to arbitrate conflicting memory access requests in the at least one caching agent conflict queue and the at least one I/O conflict queue, wherein an output of the conflict queue arbiter is coupled to an input of the memory access request arbiter.

8. The apparatus of claim 1, wherein the at least one I/O conflict queue comprises a plurality of per-class I/O conflict queues, and further wherein each virtual channel is assigned to a class.

9. The apparatus of claim 1, further comprising a plurality of queues coupled to respective inputs of the memory access request arbiter, including:
a plurality of caching agent request queues, each configured to queue requests from a respective caching agent; and
an I/O request queue, configured to queue requests from the plurality of I/O agents.

10. The apparatus of claim 1, wherein the apparatus further comprises a hardware-based anti-starvation mechanism configured to prevent memory access requests from being repeatedly blocked over multiple conflict check cycles for the same memory access request.

11. A method comprising:
receiving memory access requests originating from a plurality of hardware-based caching agents and a plurality of hardware-based Input/Output (I/O) agents in a computer system having system memory, each memory access request identifying an address associated with a cache line for which access is requested, wherein at least one portion of the system memory may be accessed by both at least one caching agent and an I/O agent; and
concurrently servicing multiple of the memory access requests to the at least one portion of the system memory that may be accessed by both at least one caching agent and an I/O agent in parallel via a distributed memory fabric employing hardware-based parallel pipelines while maintaining memory coherency for cachelines associated with the caching agents and enforcing memory access ordering for memory access requests originating from I/O agents.

12. The method of claim 11, wherein the memory access requests from the I/O agents are sent via a plurality of virtual channels implemented using hardware-based logic, and wherein enforcing memory access ordering for memory access requests originating from I/O agents comprises enforcing memory access ordering such that that requests from I/O agents that are sent via the same virtual channel appear to be serviced in the order in which they are received at the distributed memory fabric.

13. The method of claim 11, further comprising:
performing an address conflict check for each memory access request originating from a caching agent using hardware-based logic to determine whether the request conflicts with a previous memory access request for which service is pending; and
if an address conflict is detected,
enqueuing the request in a hardware-based caching agent conflict queue in which only conflicting requests are stored; otherwise,
admitting the request to proceed.

14. The method of claim 13, further comprising:
implementing first and second pipelines in the distributed memory fabric; and
for each of the first and second pipelines,
   implementing hardware-based conflict check logic for each pipeline; and
   enqueuing requests for which an address conflict is detected in a caching agent conflict queue associated with that pipeline.

15. The method of claim 14, further comprising:
for each of the first and second pipelines,
tracking, via a hardware-based scoreboard, pending memory access requests that have been admitted to proceed in the pipeline; and
for each memory access request received at the pipeline, determining whether an address conflict exists by comparing addresses of cachelines corresponding to memory access requests in the caching agent conflict queue and the scoreboard associated with the pipeline to an address of a cacheline contained in the memory access request.

16. The method of claim 11, further comprising:
employing a plurality of virtual channels to send memory access requests from I/O agents, each memory access request being sent over a virtual channel associated with the request;
performing an address conflict check for each memory access request originating from an I/O agent using hardware-based logic to determine whether the request conflicts with a pending memory access request; and
if an address conflict is detected,
   identifying the request as a conflicting request and performing a conflict ordering operation to order the conflicting request relative to other pending requests associated with the same virtual channel so as to preserve the same order in which the requests were received via the virtual channel; and
   enqueuing the conflicting request in an I/O conflict queue associated with the virtual channel, wherein the I/O conflict queue only stores conflicting requests.

17. The method of claim 11, further comprising:
implementing first and second pipelines in the distributed memory fabric;
for each of the first and second pipelines, in parallel,
performing, using hardware-based logic, an address conflict check for a memory access request originating from an I/O agent to determine whether the request conflicts with a pending memory access request; and
if there is no address conflict for each of the memory access requests being processed by the first and second pipelines for a given cycle,
admitting both of the requests for further processing by its associated pipeline.

18. The method of claim 11, further comprising:
implementing first and second pipelines in the distributed memory fabric;
for each of the first and second pipelines, in parallel,
performing, using hardware-based logic, an address conflict check for a memory access request originating from an I/O agent to determine whether the request conflicts with a pending memory access request; and
if there is an address conflict for one of the memory access requests being processed by the first and second pipelines for a given cycle,
determining a relative age for the two requests;
if an older of the two requests does not have an address conflict and a younger request does have an address conflict, admitting the older request for further processing by its associated pipeline.

19. The method of claim 11, further comprising:
implementing first and second pipelines in the distributed memory fabric;
employing a plurality of virtual channels to send memory access requests from I/O agents, each memory access request being sent over a virtual channel associated with the request;
for each of the first and second pipelines, in parallel,
performing, using hardware-based logic, an address conflict check for a memory access request originating from an I/O agent to determine whether the request conflicts with a pending memory access request; and
if there is an address conflict for one of the memory access requests being processed by the first and second pipelines for a given cycle,
determining a relative age for the two requests;
if an older of the two requests has an address conflict and both of the requests are sent via the same virtual channel, enqueuing both requests to the same I/O conflict queue with the older request preceding the younger request.

20. The method of claim 11, further comprising:
implementing first and second pipelines in the memory fabric;
employing a hash algorithm on data contained in a memory access request to route memory access requests to one of the first or second pipelines for further processing;
arbitrating, for each of a plurality of cycles, a plurality of memory access requests received as inputs to a hardware-based arbiter, the inputs including a plurality of inputs associated with memory access requests originating from caching agents and at least one input associated with memory access requests originating from I/O agents; and
granting, for each cycle, an arbitration cycle winner and forwarding the arbitration cycle winner to logic configured to implement the hash algorithm,
wherein the inputs to the arbiter further include at least one input corresponding to memory access requests that were previously arbitrated by the arbiter and for which an address conflict was detected.

21. An apparatus comprising:
an integrated circuit including,
a plurality of processor cores, each having at least one associated hardware-based caching agent;
a hardware-based system agent, operatively coupled to each of the processor cores, including a distributed and coherent memory fabric comprising a plurality of coherency pipelines and a plurality of memory fabric pipelines, each memory fabric pipeline configured to interface with a respective memory controller;
a Peripheral Component Interconnect Express (PCIe) root complex, operatively coupled to the system agent;
an I/O interconnect hierarchy, including at least one switch fabric communicatively coupled to the PCIe root complex; and
a plurality of hardware-based I/O agents, each coupled to a switch fabric in the I/O interconnect hierarchy,
wherein the integrated circuit comprises hardware-based logic configured to concurrently service memory access requests to access cachelines originating from the plurality of caching agents and the plurality of I/O agents while maintaining memory coherency for cachelines associated with caching agents, wherein a portion of the cachelines are accessible to both at least one caching agent and at least one I/O agent.

22. The apparatus of claim 21, wherein the apparatus is configured to enforce memory access ordering for memory access requests originating from I/O agents using hardware-based logic.

23. The apparatus of claim 21, wherein each memory fabric pipeline includes an admitted pool in which admitted memory requests are buffered, a scoreboard in which addresses of the admitted memory requests are stored, and an associated hardware-based caching agent conflict queue, the apparatus further comprising address hardware-based conflict check logic for each memory fabric pipeline that is configured to determine whether an address conflict exists by comparing addresses of cachelines corresponding to memory access requests in its associated caching agent conflict queue and its scoreboard to an address of a cacheline referenced in the currently-evaluated memory access request.

24. The apparatus of claim 21 wherein the system agent further comprises:
at least one hardware-based caching agent conflict queue;
at least one hardware-based I/O conflict queue, separate from the at least one hardware-based caching agent conflict queue; and
address conflict handling logic, configured to determine if a currently-evaluated memory access request is in conflict with another pending memory access request and configured to enqueue conflicting memory access requests from caching agents in the at least one caching agent conflict queue and enqueue conflicting memory access requests from I/O agents in the at least one I/O agent conflict queue wherein the at least one caching agent conflict queue only stores conflicting memory access requests from caching agents and the at least one I/O agent conflict queue only stores conflicting memory access requests from I/O agents.

25. The apparatus of claim 24, wherein the system agent further comprises:
a hardware-based conflict queue arbiter configured to arbitrate conflicting memory access requests in the at least one caching agent conflict queue and the at least one I/O conflict queue.

26. A system comprising:
a chassis;
a main board, disposed within the chassis;
a multicore processor, coupled to or mounted on the main board, including,
a plurality of processor cores, each having at least one associated hardware-based caching agent;
a hardware-based system agent, operatively coupled to each of the processor cores, including a distributed and coherent memory fabric comprising a plurality of coherency pipelines and a plurality of memory fabric pipelines, each memory fabric pipeline configured to interface with a respective memory controller;
a Peripheral Component Interconnect Express (PCIe) root complex, operatively coupled to the system agent;
an I/O interconnect hierarchy, including at least two switch fabrics communicatively coupled to the PCIe root complex; and
a plurality of I/O interfaces, each coupled to a switch fabric and including a hardware-based I/O agent;
at least two memory devices, coupled to or mounted on the main board, configured as first and second blocks of system memory;
first and second memory controllers, operatively coupled to respective memory fabric pipelines, each coupled to at least one memory device and configured to access a respective block of system memory;
a plurality of I/O devices coupled to or mounted on the main board and coupled to a respective I/O interface;
a touch screen display, mounted to the chassis and operatively coupled to the multicore processor;
flash memory, coupled to the multicore processor, having BIOS instructions stored therein to configure the multicore processor;
wherein, upon loading of the BIOS instructions, the multicore processor is configured to facilitate concurrent servicing of memory access requests to access cachelines originating from the plurality of caching agents and the plurality of I/O agents while maintaining memory coherency for cachelines associated with caching agents, wherein a portion of the cachelines are accessible to both at least one caching agent and at least one I/O agent.

27. The system of claim 26, wherein the multicore processor is configured to enforce memory access ordering for memory access requests originating from I/O agents.

28. The system of claim 26, wherein each memory fabric pipeline includes an admitted pool in which admitted memory requests are buffered, a scoreboard in which addresses of the admitted memory requests are stored, and an associated hardware-based caching agent conflict queue, the system further comprising hardware-based address conflict check logic for each memory fabric pipeline that is configured to determine whether an address conflict exists by comparing addresses of cachelines corresponding to memory access requests in its associated caching agent conflict queue and its scoreboard to an address of a cacheline referenced in the currently-evaluated memory access request.

29. The system of claim 26, wherein the system agent further comprises:
at least one hardware-based caching agent conflict queue;
at least one I/O conflict queue, separate from the at least one hardware-based caching agent conflict queue; and
hardware-based address conflict handling logic, configured to determine if a currently-evaluated memory access request is in conflict with another pending memory access request and configured to enqueue conflicting memory access requests from caching agents in the at least one caching agent conflict queue and enqueue conflicting memory access requests from I/O agents in the at least one I/O agent conflict queue.

* * * * *